(12) United States Patent
Saito

(10) Patent No.: US 8,335,386 B2
(45) Date of Patent: Dec. 18, 2012

(54) IMAGE ENCODING DEVICE AND IMAGE DECODING DEVICE

(75) Inventor: Hiroshi Saito, Osaka (JP)

(73) Assignee: Panasonic Corporation, Osaka (JP)

(*) Notice: Subject to any disclaimer, the term of this patent is extended or adjusted under 35 U.S.C. 154(b) by 376 days.

(21) Appl. No.: 12/829,546

(22) Filed: Jul. 2, 2010

(65) Prior Publication Data

US 2011/0013849 A1  Jan. 20, 2011

(30) Foreign Application Priority Data

Jul. 3, 2009 (JP) .................... 2009-158718

(51) Int. Cl.
*G06K 9/36* (2006.01)
*G06K 9/46* (2006.01)

(52) U.S. Cl. ........................................ 382/233

(58) Field of Classification Search ............ 382/173, 382/232, 233, 236, 238; 348/14.12, 413, 348/416; 375/222, 254, 260
See application file for complete search history.

(56) References Cited

U.S. PATENT DOCUMENTS 5,903,608 A * 5/1999 Chun ........................ 375/260
5,978,509 A * 11/1999 Nachtergaele et al. ...... 382/236
8,223,191 B2 * 7/2012 Elbaz et al. .............. 348/14.12
2011/0013849 A1 * 1/2011 Saito ........................ 382/233

FOREIGN PATENT DOCUMENTS

JP  59-097272  6/1984

OTHER PUBLICATIONS

ISO/IEC 13818-2 Information technology—Generic coding of moving pictures and associated audio information: Video, 2000.
ISO/IEC 14496-10 Information technology—Coding of audio-visual objects—Part 10: Advanced video coding, 2004.

* cited by examiner

*Primary Examiner* — Amir Alavi

(74) *Attorney, Agent, or Firm* — Renner, Otto, Boisselle & Sklar, LLP

(57) ABSTRACT

An image encoding device includes: an image division section for dividing one frame of image into a plurality of image fragments, grouping the plurality of image fragments into N sets (N: an integer of 2 or more), and outputting the N sets of image fragments as N partial images; an image swapping section for swapping at least one image fragment with another between the N partial images to thereby output N partial images each having shuffled image fragments; and an encoding section for encoding the N partial images output from the image swapping section.

15 Claims, 20 Drawing Sheets

FIG.14
(a) 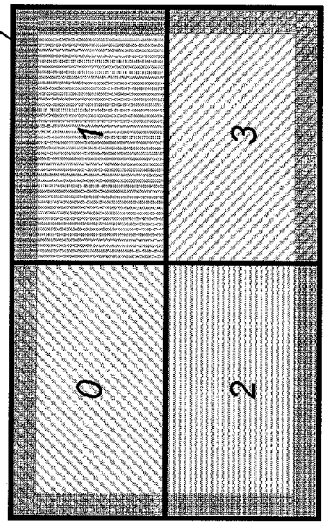 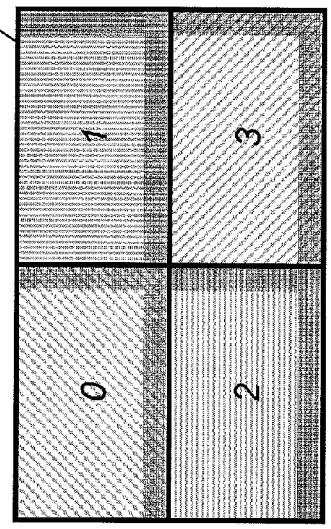
EXPANDED INPUT IMAGE 1300 → FIRST IMAGE DIVISION SECTION 100 → GROUP OF PARTIAL IMAGES 1301
(b) 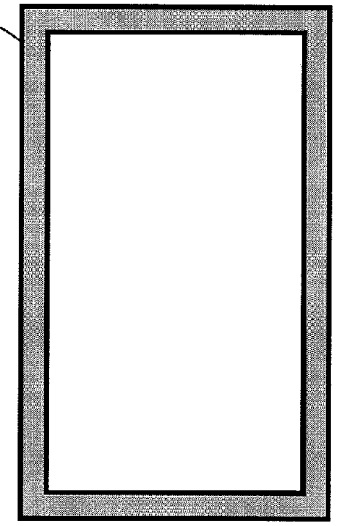 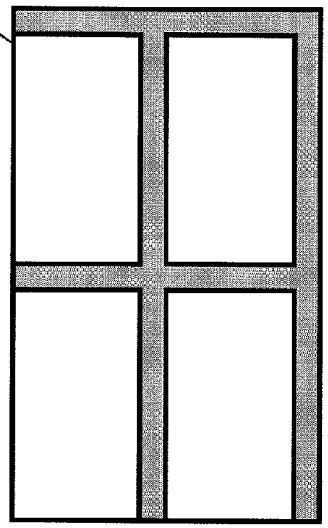
EXPANDED INPUT IMAGE 1302 → FIRST IMAGE DIVISION SECTION 100 → GROUP OF PARTIAL IMAGES 1303

IMAGE ENCODING DEVICE AND IMAGE DECODING DEVICE

BACKGROUND OF THE INVENTION

1. Field of the Invention

The present invention relates to an image encoding device for dividing a high-resolution image into a plurality of partial images and compressing/encoding the partial images in parallel, and to an image decoding device for decoding the compressed/encoded image.

2. Description of the Related Art

A motion picture includes a sequence of frames. With codecs used in recording apparatus for use in broadcasting stations or for household use, a motion picture is compressed/encoded frame by frame or by using differences between frames, for example. The amount of calculation of a codec required for compression/encoding increases as the number of pixels of one frame (spatial resolution) and the frame rate (temporal resolution) increase.

In order to compress/encode such a motion picture in real time, there are many methods known in the art in which the compression/encoding process is parallelized by spatially dividing each frame and temporally dividing a plurality of frames. However, since the motion picture compressing/encoding process is a technique for efficiently reducing the amount of data by utilizing the spatial and temporal correlation between frames, the division process for parallelization may lower the compression efficiency. In view of this, there are parallelization methods proposed in the art in which the decrease in the compression efficiency due to the division process is minimized. Although there are various combinations, these proposals are generally classified into two, in terms of the basic approach, i.e., the spatial division and the temporal division (e.g., Japanese Laid-Open Patent Publication No. 59-97272.

In the "spatial division", a high-resolution video signal is spatially divided into a plurality of partial images. Individual partial images are encoded in parallel by a codec to obtain compressed data. Finally, individual compressed data are integrated together. The codec does not need to have such a high performance that a high-resolution image can be processed, and it only needs to have such a performance that a low-resolution image can be processed. With the spatial division, the efficiency of the intra-frame compression, which utilizes the correlation between pixels that are spatially adjacent to each other, lowers at boundaries between partial images. Conventional methods attempted to not lower the inter-frame compression efficiency by dividing a high-resolution image into partial images so that there are overlaps between partial images over the motion compensation search range. The spatial division is advantageous in that the process delay can be kept small because the process unit for parallelization can be limited to one frame.

In the "temporal division", a motion picture is divided into portions by reproduction time by the unit of one frame or a plurality of frames, while keeping the resolution of each frame as it is. As a result, there are a plurality of groups of frames, with each group having a relatively short duration. The individual groups of frames are processed in parallel by a codec to obtain compressed data. Finally, compressed data are integrated together. The temporal division does not lower the intra-frame compression efficiency because the correlation between adjacent pixels within a frame can be utilized to the maximum extent. However, it is necessary, for the groups of frames to be independently processed in parallel, that frames of different groups do not reference one another, thus lowering the inter-frame compression efficiency. For example, where the parallel processing is performed by the unit of GOPs (Group Of Picture) in MPEG-2 of "ISO/IEC 13818-2 Information technology—Generic coding of moving pictures and associated audio information: Video", it is necessary to use the closed GOP where GOPs do not reference one another. Processing a plurality of GOPs in parallel requires a large-capacity frame buffer memory, thus increasing the process delay. Since an increase in the process delay makes more difficult the code quantity control of controlling the quantity of code generated to be a predetermined quantity, there are only limited conditions under which the temporal division can be used for parallel processing.

Therefore, it is often the case with conventional methods that when a high-resolution motion picture is divided into pieces for compression/encoding, images are spatially divided into pieces for parallel processing.

If an input video is spatially divided into pieces for parallel compression/encoding by a known method, the compression/encoding difficulty varies between the spatially-divided partial images because the partial images contain different graphic patterns from one another. Therefore, if an image is compressed/encoded using the same compression parameters with any of many compression/encoding schemes which employ a variable-length code, the quantity of code generated varies between partial images. On the other hand, if the compression parameters are adjusted for each partial image so as to even out the quantities of code generated for different partial images, the compression distortion then varies between partial images, thus making the division boundaries more conspicuous on the screen. It is very difficult to control the quantity of code so that a predetermined total quantity of code will be generated eventually for all partial images while independently processing the individual partial images in parallel.

Particularly, the problem above is more pronounced when spatial division is used with MPEG-4 AVC/H.264 (e.g., "ISO/IEC 14496-10 Information technology—Coding of audio-visual objects—Part 10: Advanced video coding") which has drawn public attention for its high compression efficiency. MPEG-4 AVC/H.264 significantly improves the compression efficiency by referencing adjacent pixels within each frame. However, at the boundary between partial images, it is not possible to use the correlation between pixels belonging to different partial images even if the pixels are spatially adjacent to each other. Therefore, if the spatial image division is used with MPEG-4 AVC/H.264, it is not possible to avoid a decrease in the intra-frame compression efficiency that is even more significant than those with more traditional compression schemes.

SUMMARY OF THE INVENTION

The present invention has been made in order to solve the problems above, and an object thereof is to realize encoding of an image by dividing each frame into a plurality of partial images, wherein the uneven distribution in compression distortion between partial images is eliminated so that the division boundaries are inconspicuous.

An image encoding device of the present invention includes: an image division section for dividing one frame of image into a plurality of image fragments, grouping the plurality of image fragments into N sets (N: an integer of 2 or more), and outputting the N sets of image fragments as N partial images; an image swapping section for swapping at least one image fragment with another between the N partial images to thereby output N partial images each having shuffled image fragments; and an encoding section for encoding the N partial images output from the image swapping section.

In one embodiment of the invention, the N partial images correspond respectively to a plurality of areas into which the one frame of image is divided.

In one embodiment of the invention, the image division section includes: a first image division section for dividing the one frame of image into the N partial images; and a second image division section for further dividing each of the N partial images from the first image division section into image fragments, and outputting the image fragments.

In one embodiment of the invention, the second image division section divides each of the N partial images into a number of image fragments which is an integral multiple of N.

In one embodiment of the invention, the image division section generates image fragments having the same shapes as those of slices preset in the encoding section.

In one embodiment of the invention, the image division section generates partial images each formed by image fragments of the same shape.

In one embodiment of the invention, the image division section generates partial images each formed by image fragments of different shapes.

In one embodiment of the invention, each of the slices is formed by a plurality of macroblocks; and the image division section generates the image fragments so that for any macroblock, a plurality of adjacent macroblocks are included.

In one embodiment of the invention, the image division section determines a size of each of the N partial images so that the encoding section can process each partial image.

In one embodiment of the invention, the image encoding device further includes an image expansion section for adjusting a size of the one frame of image so that the size is an integral multiple of a size which can be processed by the encoding section in a case where the size of the one frame of image is not an integral multiple of a size which can be processed by the encoding section.

In one embodiment of the invention, the image expansion section adds a plurality of pixels to the one frame of image to thereby adjust the size of the one frame of image so that the size is an integral multiple of a size which can be processed by the encoding section; and each of the added pixels has a pixel value which cannot possibly be taken by a pixel which is part of the one frame of image.

In one embodiment of the invention, the image expansion section adjusts the size of the one frame of image so that the size is an integral multiple of a size which can be processed by the encoding section so that the added pixels are evenly included in the N partial images.

An image encoding device of the present invention includes: a decoding section for decoding each of N encoded partial images; an image division section for dividing each of the N decoded partial images into a plurality of image fragments having a predetermined shape; a decoded image swapping section for swapping at least one image fragment with another between the N partial images based on a predetermined rule to thereby output N partial images each having shuffled image fragments; and a decoded image integration section for integrating together the N partial images output from the decoded image swapping section into a single image, and outputting the decoded image.

In one embodiment of the invention, data of the N encoded partial images includes, as management information, at least one of information regarding the number of partial images into which one frame of image is divided, information regarding a shape of image fragments into which each partial image is divided, information regarding the number of image fragments, and a rule regarding a swapping scheme for swapping image fragments with one another in an encoding process; the image decoding device further includes an encoding information obtaining section for obtaining the management information which is transmitted together with the data of the N encoded partial images; and at least one of the image division section, the decoded image swapping section and the decoded image integration section operates based on the management information obtained by the encoding information obtaining section.

According to the present invention, at least one image fragment is swapped with another between N partial images, and it is therefore possible to improve the uneven distribution of graphic patterns between spatially-divided partial images, and to level the compression difficulty between partial images. Even with a compression scheme that highly utilizes the correlation between adjacent pixels within a frame, adjacent pixels are not referenced across slice boundaries. Therefore, if the image fragment division boundaries coincide with the slice boundaries, it is possible to prevent the compression efficiency from lowering due to spatial image division.

(a) of FIG. 14 is a diagram showing an expanded input image 1300 in which invalid pixels are added around an input image, and (b) of FIG. 14 is a diagram showing an expanded input image 1302 in which invalid pixels are added in an L-shaped pattern and a cross-shaped pattern to an input image.

Figure 15:
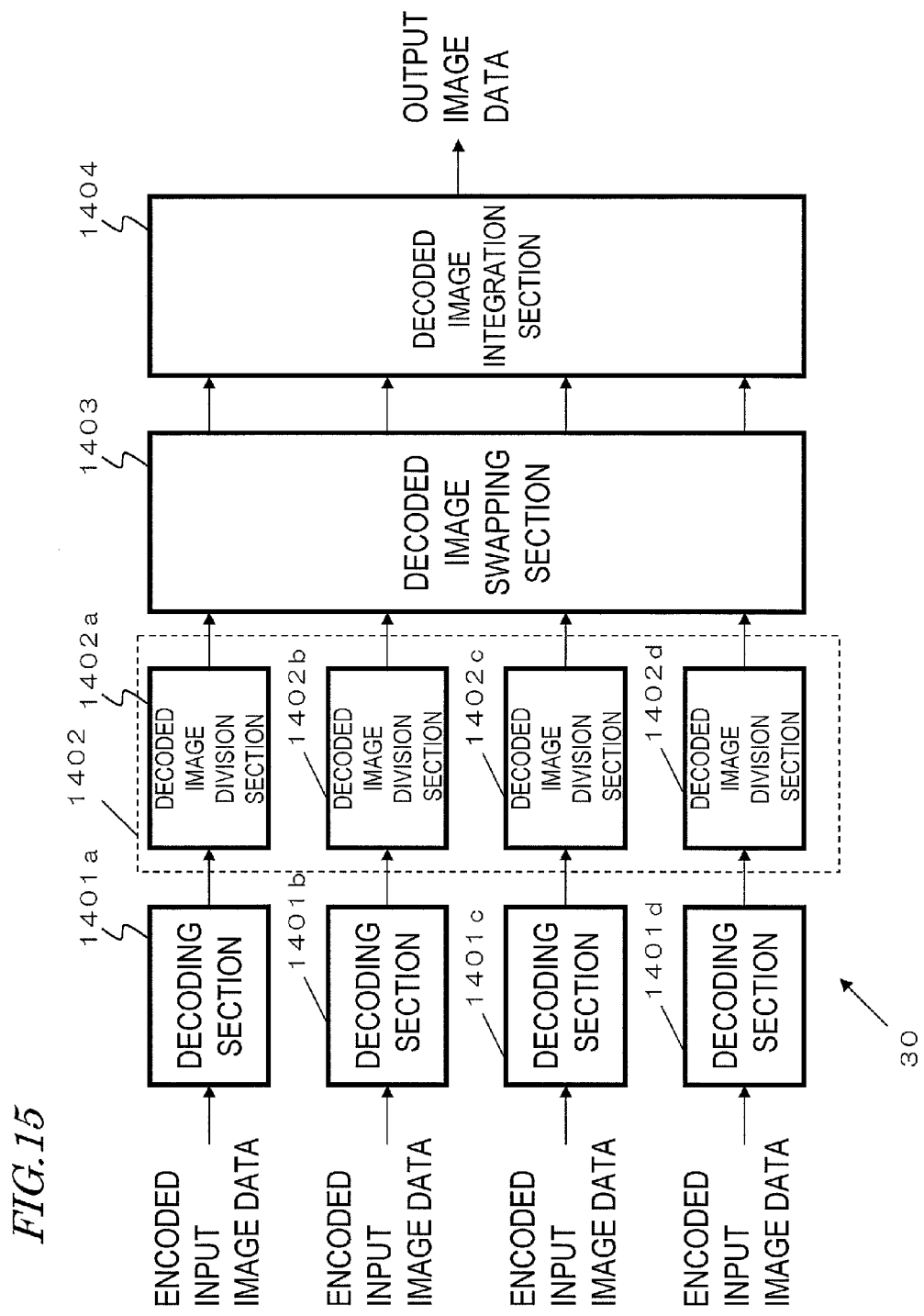

FIG. 15 is a block diagram showing a configuration of an image decoding device 30 according to Embodiment 4.

Figure 16:
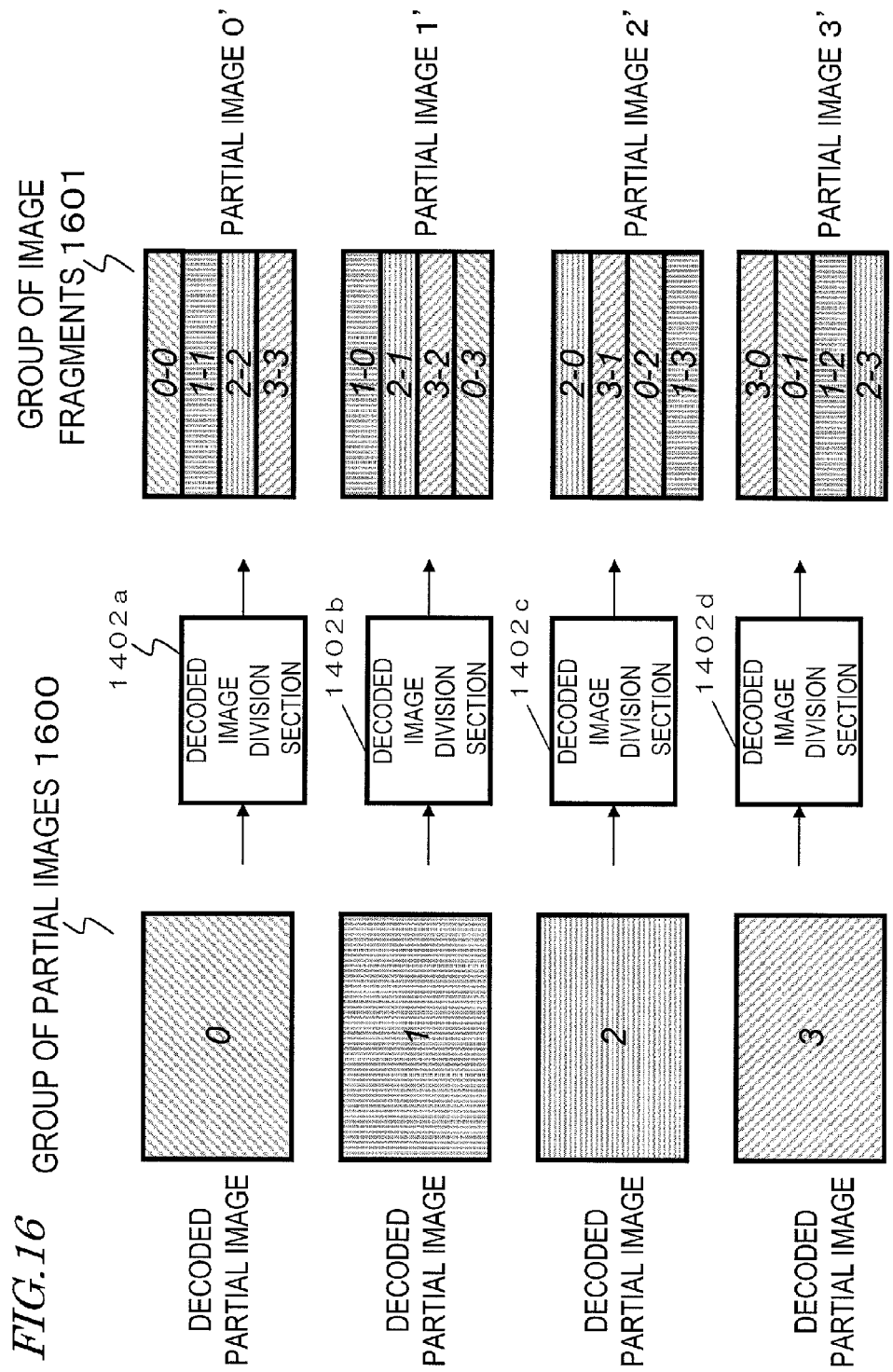

FIG. 16 is a diagram schematically showing the process of decoded image division sections 1402a to 1402d.

Figure 17:
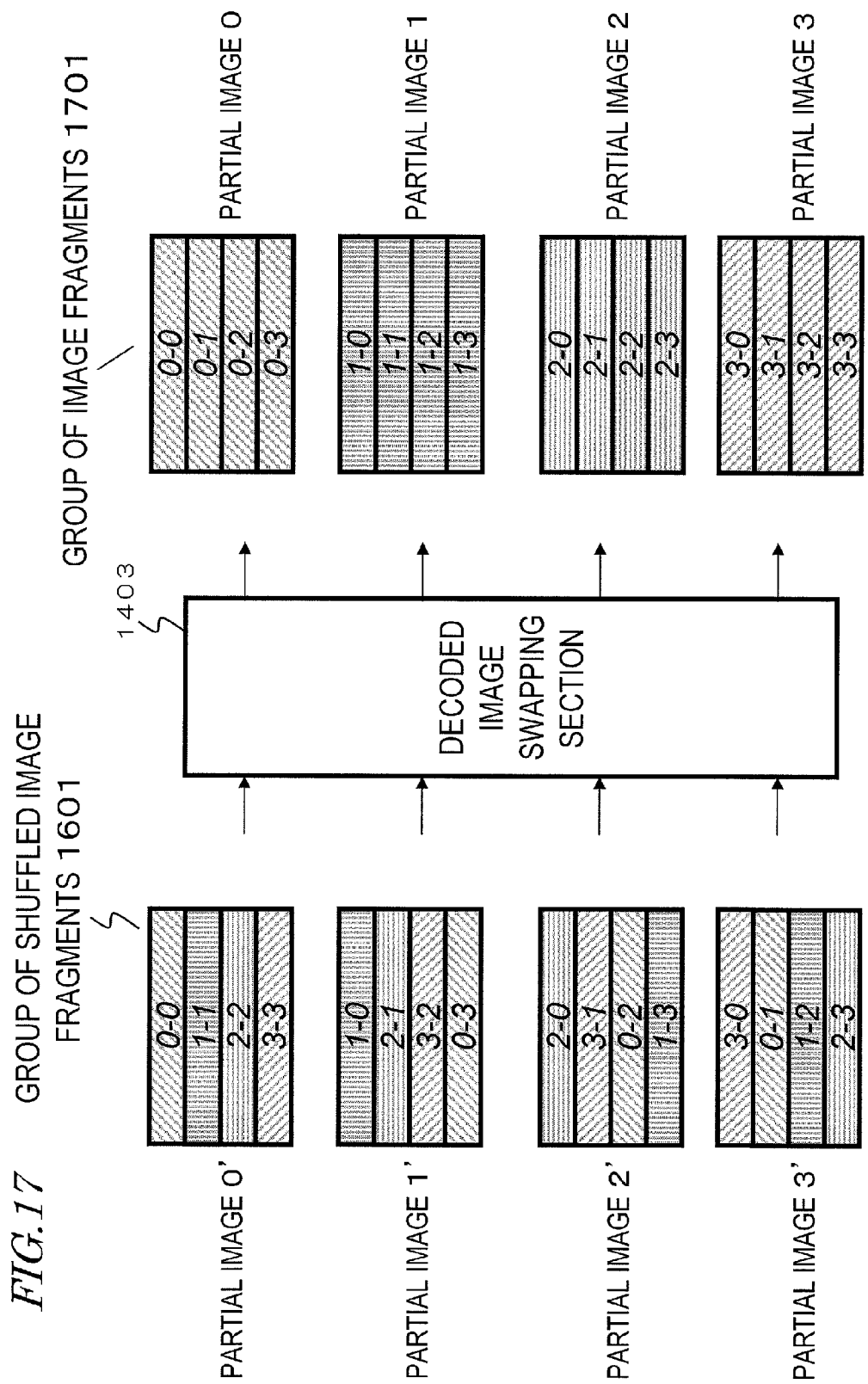

FIG. 17 is a diagram schematically showing the process of a decoded image swapping section 1403.

Figure 18:
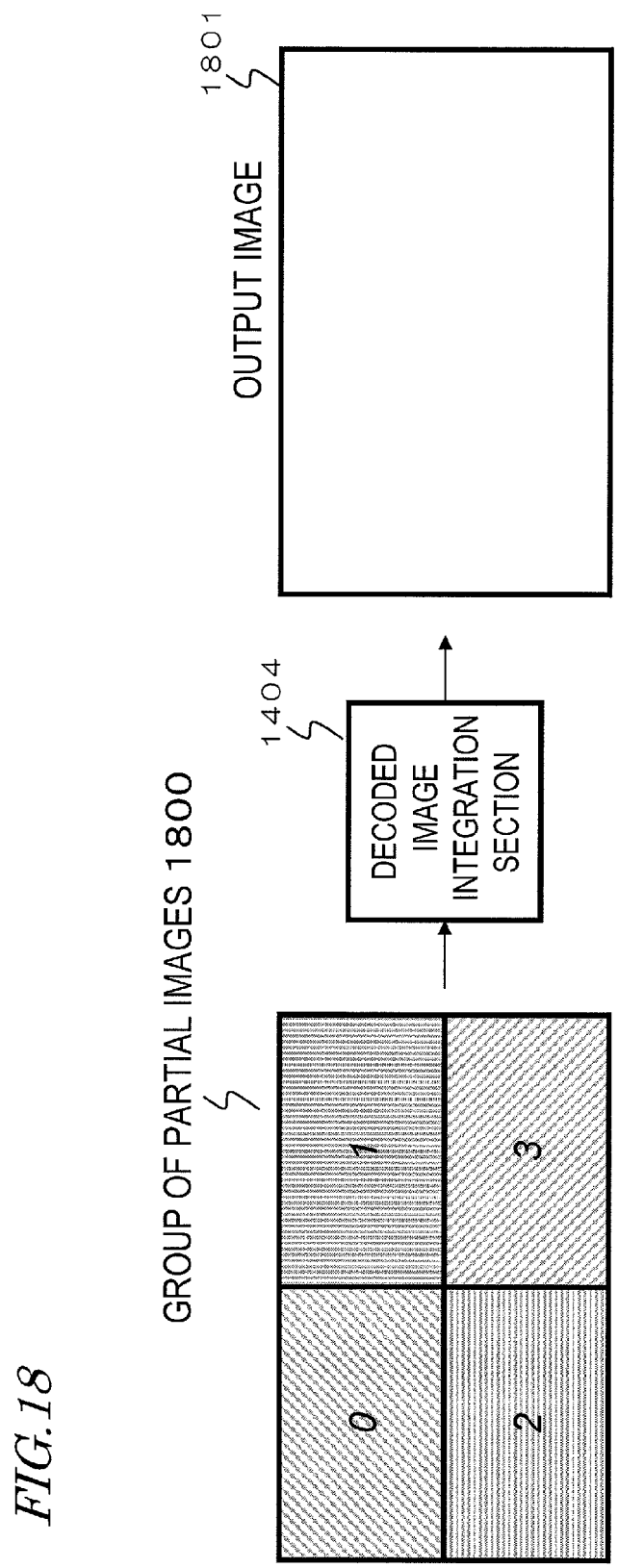

FIG. 18 is a diagram showing an integration method for integrating together a group of partial images 1800 by a decoded image integration section 1404.

Figure 19:
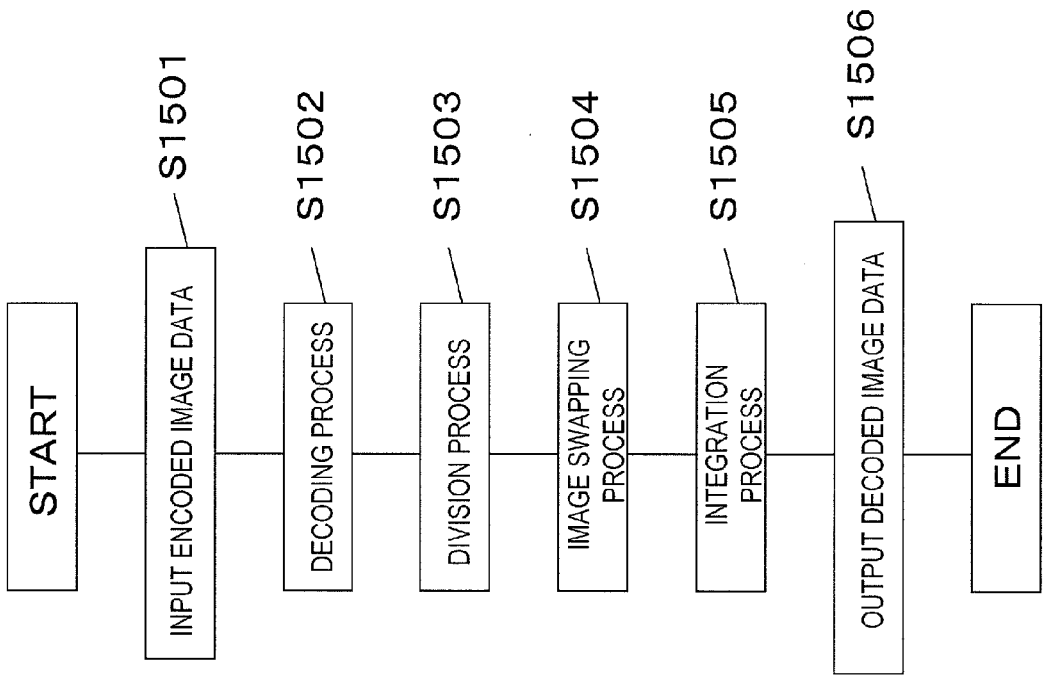

FIG. 19 is a flow chart showing the procedure of an operation of the image decoding device 30.

Figure 20:
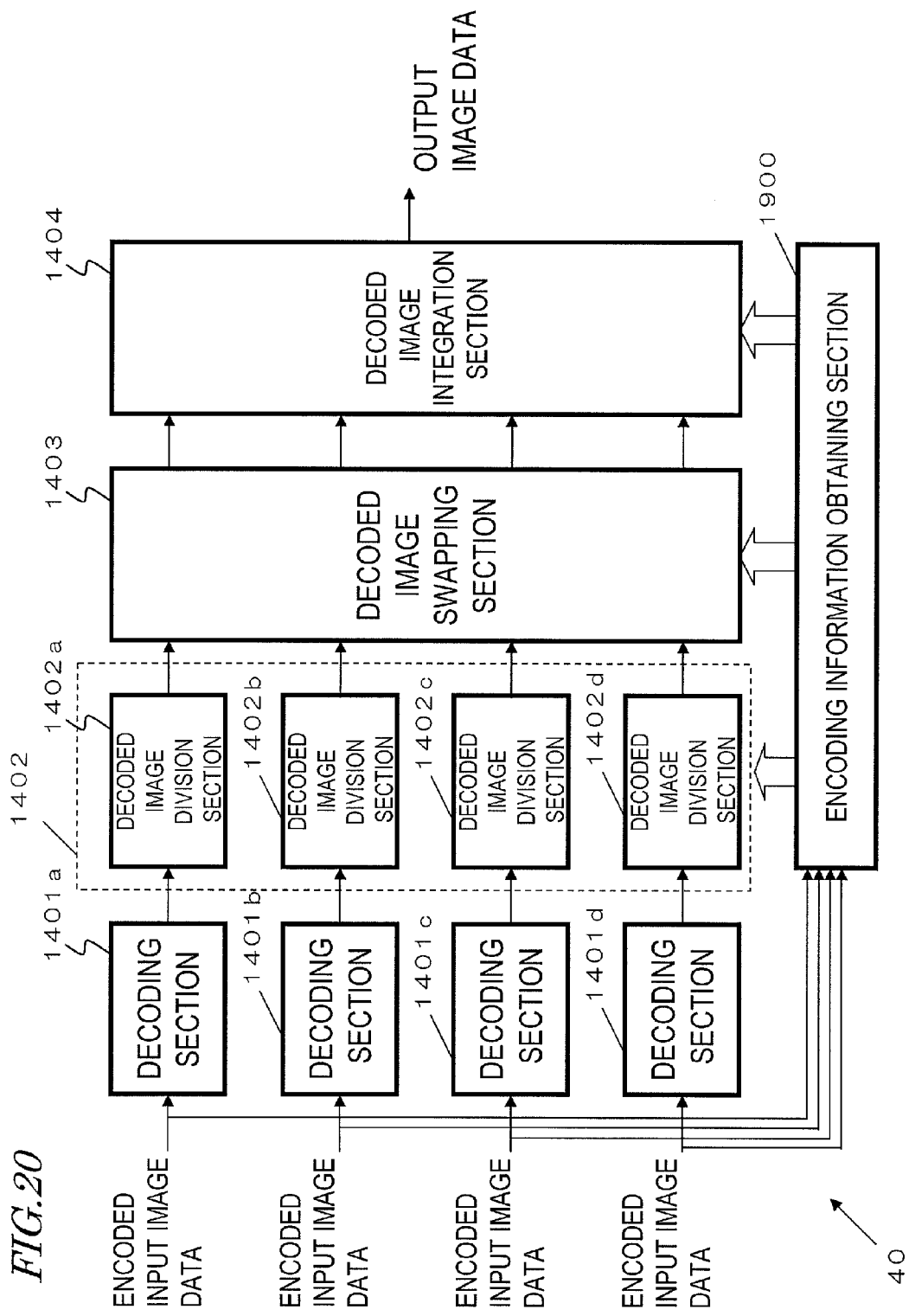

FIG. 20 is a diagram showing a configuration of an image decoding device 40 according to Embodiment 5.

DETAILED DESCRIPTION OF PREFERRED EMBODIMENTS

Image encoding devices and image decoding devices according to embodiments of the present invention will now be described with reference to the accompanying drawings.

Each embodiment below will be described assuming that the image encoding device and the image decoding device are recording apparatus and reproduction apparatus, respectively, used in a broadcasting station. However, that is merely illustrative. Only the image decoding device may be reproduction apparatus for household use, or the image encoding device may also be recording apparatus for household use.

Embodiment 1

1-1. Configuration of Image Encoding Device

Figure 1:
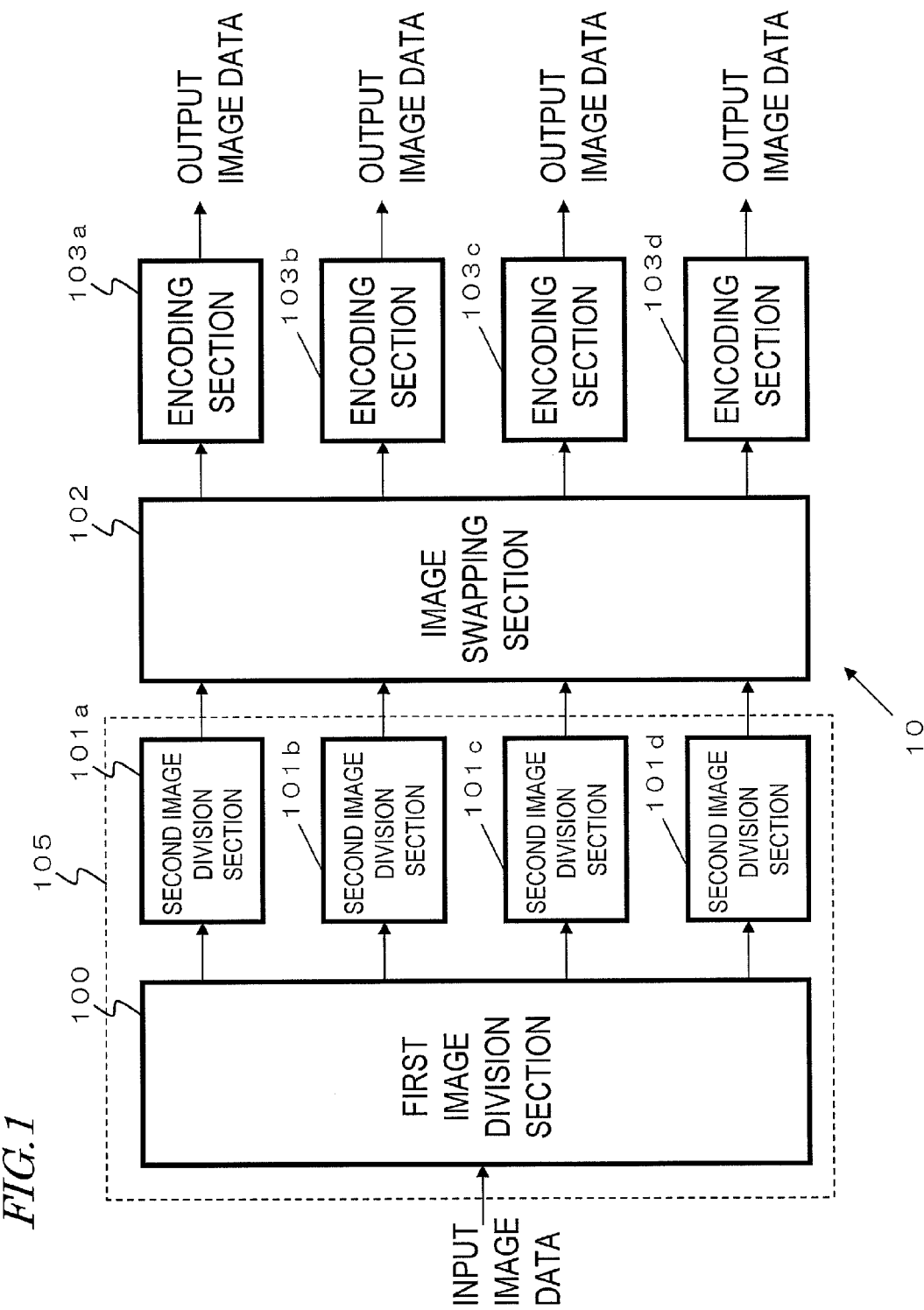
FIG. 1 is a block diagram showing a configuration of an image encoding device 10 according to Embodiment 1.

FIG. 1 is a block diagram showing a configuration of an image encoding device 10 of the present embodiment. The image encoding device 10 includes a first image division section 100, second image division sections 101*a* to 101*d*, an image swapping section 102, and encoding sections 103*a* to 103*d*.

The first image division section 100 receives image data. The first image division section 100 spatially divides the received image data into image data each of an appropriate size. The data of divided images (hereinafter referred to as "partial images") are encoded in parallel in the encoding sections 103*a* to 103*d* after subsequent processes.

Figure 2:
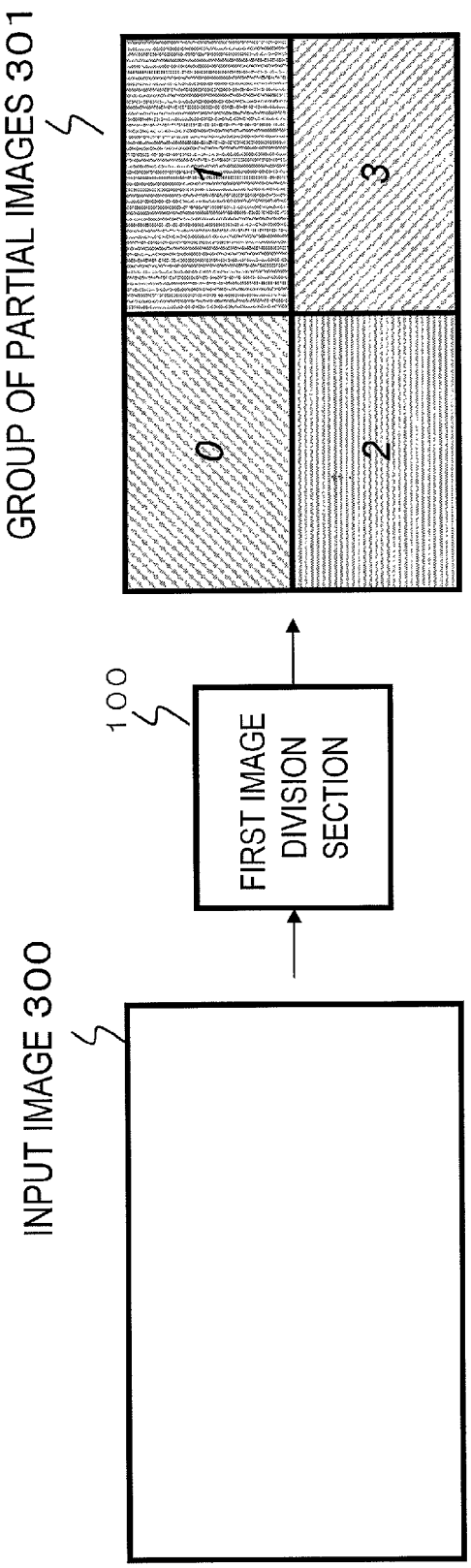
FIG. 2 is a diagram schematically showing the process of a first image division section 100.

FIG. 2 schematically shows the process of the first image division section 100. The first image division section 100 receives image data of an input image 300, and performs a spatial division process. A group of four partial images 301 is obtained as a result of the division process. In the present embodiment, the first image division section 100 divides the input image into four rectangular partial images of an equal size. The partial images are herein numbered 0, 1, 2 and 3 starting from upper left, as shown in the figure, for the purpose of discussion.

In the present embodiment, the input image is an image of a size that is known as "8K4K" including 8192 pixels (horizontal) by 4320 pixels (vertical), for example. Each of partial images 0 to 3 is an image of a size of 2048 pixels (horizontal) by 1080 pixels (vertical).

Note that the input image size and the image size of a divided piece shown above are merely illustrative. As another example, the first image division section 100 may receive data of an image of 7680 pixels (horizontal) by 4320 pixels (vertical), and divide it into partial images each of 1920 pixels (horizontal) by 1080 pixels (vertical).

While the first image division section 100 divides an image into four rectangular areas of an equal size in the present embodiment, the shape and the number of divided pieces are not limited thereto. For example, the number of divided pieces may be any number that is at least two.

The process of the first image division section 100 will hereinafter be referred to as the "first division process" for the purpose of discussion.

The second image division sections 101*a* to 101*d* shown in FIG. 1 receive partial images 0 to 3, respectively, of the group of partial images 301 obtained by the first image division section 100, and further spatially divide each partial image into pieces. In the present embodiment, the number of the second image division sections is equal to the number of partial images generated by the first image division section 100. The second image division sections 101*a* to 101*d* perform division processes of the partial images in parallel. Each of images obtained by further dividing a divided partial image will hereinafter be referred to as a "image fragment".

Figure 3:
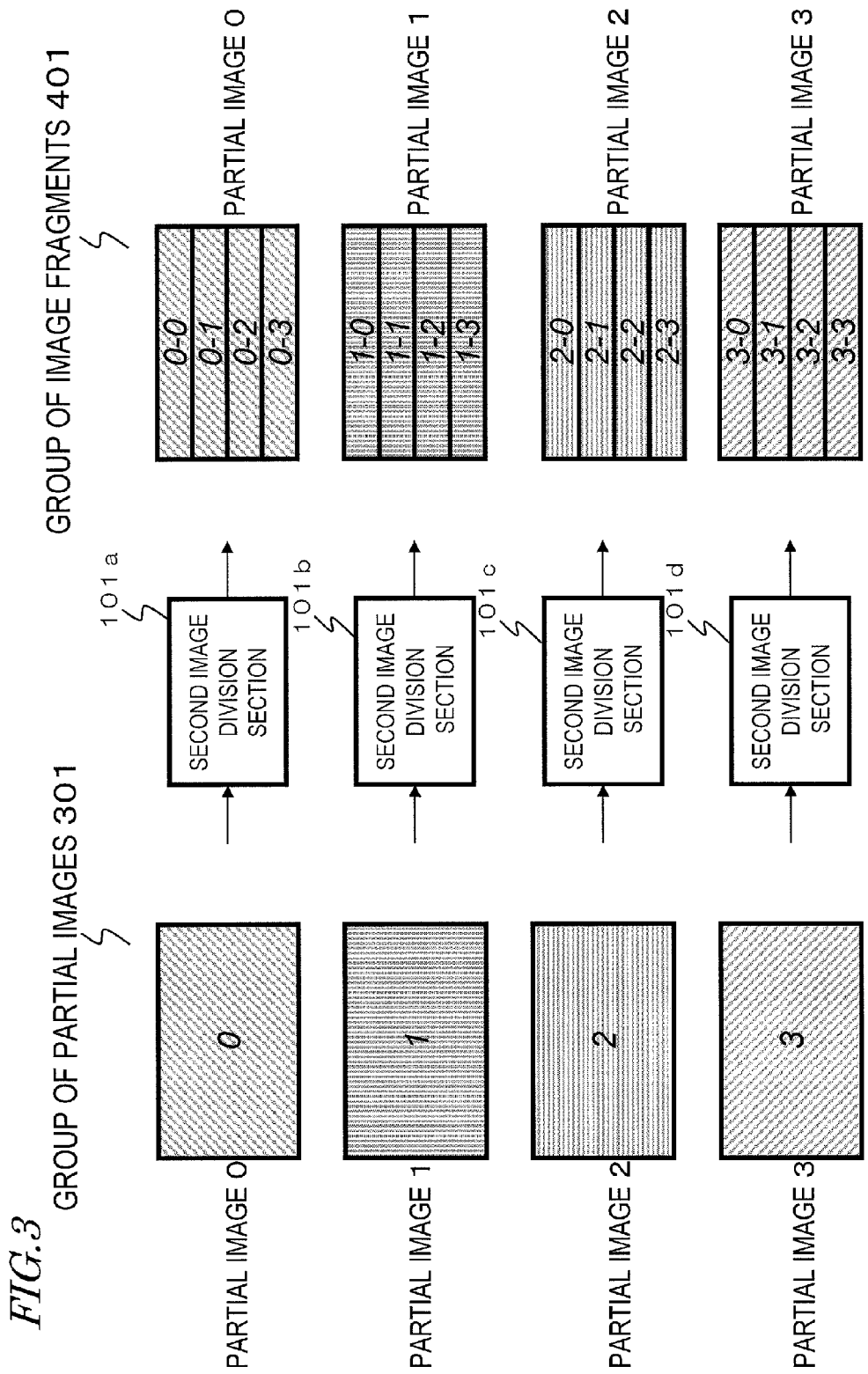
FIG. 3 is a diagram schematically showing the process of second image division sections 101a to 101d.

FIG. 3 schematically shows the process of the second image division sections 101*a* to 101*d*.

The second image division sections 101*a* to 101*d* receive partial images 0 to 3, respectively, and perform a spatial division process. Specifically, the second image division sections 101*a* to 101*d* re-divide partial images 0 to 3 into a group of even smaller image fragments 401. The number of image fragments of the group of image fragments 401 is a multiple of four, which is the number of partial images generated by the first image division section 100.

In the present embodiment, the second image division sections 101*a* to 101*d* divide partial images each into four strip-shaped image fragments. Image fragments of the group of image fragments 401 obtained by the division process of the second image division sections 101*a* to 101*d* are designated with hyphenated numbers "-0", "-1", "-2" and "-3" following their partial image numbers "0" to "3".

Where partial images 0 to 3 each have a size of 2048 pixels (horizontal) by 1080 pixels (vertical), the size of an image fragment is 2048 pixels (horizontal) by 256 pixels (vertical).

Note that while the second image division sections 101*a* to 101*d* each divide a partial image into four strip-shaped pieces in the present embodiment, the shape and the number of divided pieces are not limited thereto. The number of divided pieces of the second image division section 101 may not be an integral multiple of the number of partial images obtained by the first image division section 100. The leveling effect can be obtained as long as there are a certain number of image fragments such that the image fragments can be swapped and shuffled as will be described later in detail.

Note that in the present embodiment, the same number of second image division sections 101 as the number of partial images is provided for processing partial images in parallel. Note however that this is merely illustrative. The number of second image division sections 101 may be any number that is at least one, and the division process may be performed in a time-division parallel process.

The process of the second image division sections 101*a* to 101*d* will hereinafter be referred to as the "second division process" for the purpose of discussion.

Moreover, in the present embodiment, the first image division section 100 and the four second image division sections are provided separately from each other. However, they may be replaced by a single component. That is, with the example described above, one input image may be spatially divided into 16 image fragments without generating partial images. FIG. 1 shows an image division section 105 for dividing one input image into 16 image fragments.

The image swapping section 102 shown in FIG. 1 performs the process of swapping image fragments of partial images between the partial images.

Figure 4:
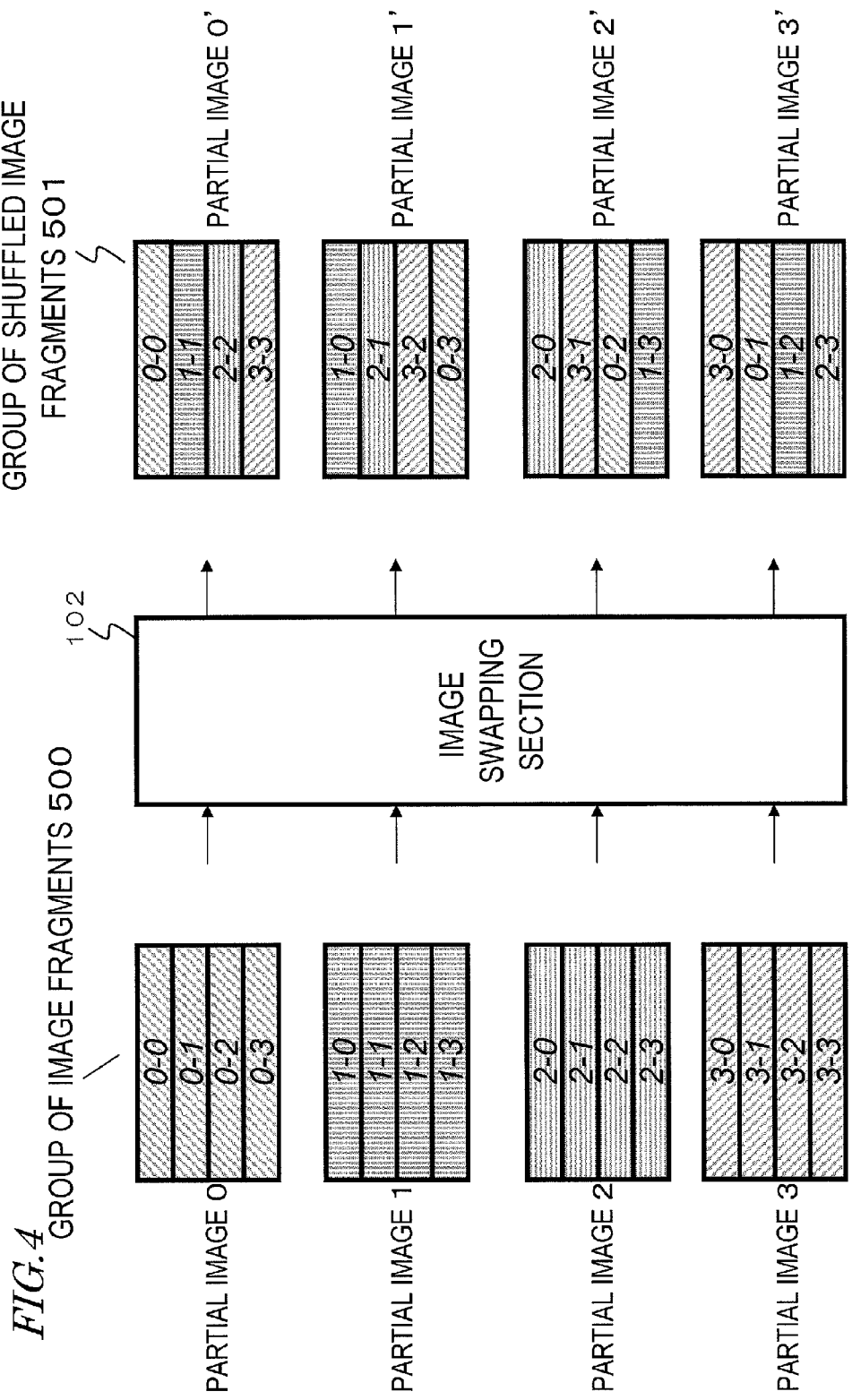
FIG. 4 is a diagram schematically showing an image fragment swapping scheme of an image swapping section 102.

FIG. 4 schematically shows the image fragment swapping scheme of the image swapping section 102. A group of image fragments 500 generated by the first image division section 100 and the second image division sections 101*a* to 101*d* includes four image fragments for each partial image. The total number of image fragments is 16.

The image swapping section 102 swaps image fragments between partial images to thereby generate a group of shuffled image fragments 501, and groups the image fragments into partial images 0', 1', 2' and 3' each including four image fragments. Since the second image division sections 101a to 101d divide partial images into image fragments so that the number of image fragments is a multiple of the number of partial images obtained by the first image division section 100 in the present embodiment, the swapping can be done in such a manner that image fragments of all partial images are evenly included in each of partial images 0', 1', 2' and 3'.

As an example, referring to FIG. 4, partial image 0' with shuffled image fragments includes image fragments 0-0, 1-1, 2-2 and 3-3. Image fragments of all partial images 0 to 3 are included also in each of partial images 1', 2' and 3' with shuffled image fragments.

Figure 5:
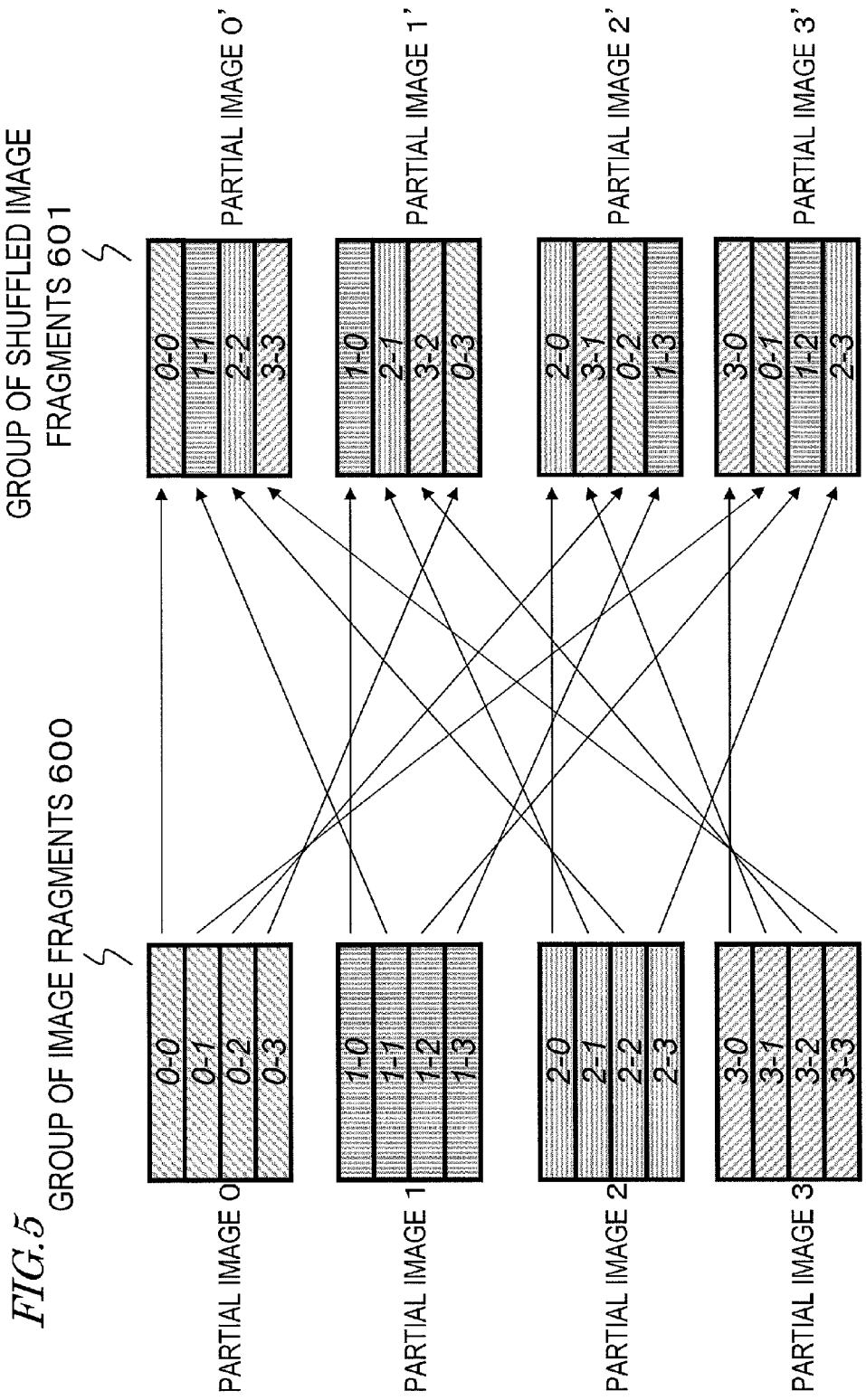
FIG. 5 is a diagram showing an example of a shuffling rule of the image swapping section 102.

FIG. 5 shows an example of a shuffling rule of the image swapping section 102. In the present embodiment, the image shuffling rule is defined by the following expression.

Shuffled image fragment [x]-[y]=Image fragment [(x+y)%N]-[y]

where [x]-[y] is the number (0-0, 0-1, 0-2, 0-3, 1-0, etc.) designating an image fragment as used in FIGS. 3 to 5. N is the number of divided pieces of the first image division section 100. M is the number of divided pieces of the second image division sections 101a to 101d. Moreover, x is an integer from 0 to N−1, and y is an integer from 0 to M−1. In the present embodiment, N=4 and M=4. The symbol "%" in the expression denotes a remainder operator.

Although the present embodiment is an embodiment where image fragments are swapped based on the above expression, the image swapping section 102 may be any image swapping section as long as image fragments of all partial images can be shuffled as evenly as possible, and similar advantages to those of the present embodiment can be obtained by shuffling rules other than that disclosed in the present embodiment. It is assumed herein that image fragments are evenly shuffled if a partial image with shuffled image fragments includes at least one image fragment from each partial image.

Note however that image fragments do not need to be strictly evenly shuffled. For example, it may only be required that at least one image fragment of a partial image is swapped with an image fragment of another partial image. The advantages of the present invention can be obtained even in such a case, as compared with cases where no shuffling is done.

Each of the encoding sections 103a to 103d encodes a corresponding one of the partial images output from the image swapping section 102 in which image fragments have been swapped. The encoding is performed based on the MPEG-4 AVC/H.264 standard, for example. In the present embodiment, the number of the encoding sections 103a to 103d is equal to the number of partial images generated by the first image division section 100 so that the partial images are encoded in parallel. The encoding sections 103a to 103d each output encoded image data. The image data may be output as separate pieces of data or may be output as a set of four pieces of data. In either case, there may be a certain rule for the order in which the data are arranged. For example, the image data generated by the encoding section 103a may be the first data, followed by the image data generated by the encoding section 103b, the image data generated by the encoding section 103c, and the image data generated by the encoding section 103d, in this order.

Moreover, each encoded image data output may include information added thereto indicating which one of the encoding sections 103a to 103d has encoded that encoded image data. This information is referenced in the decoding process to be described later. This information may be embedded in UMID information as metadata in encoded data, for example. UMID information is identification information uniquely added to each encoded data.

Note that the present embodiment is an embodiment where the number of the encoding sections 103a to 103d is equal to the number of partial images so that the partial images can be encoded in parallel. It is considered that such a configuration is advantageous at present in terms of cost. That is because although developments have been made for circuits capable of encoding an image of the "8K4K" size as it is, undivided, such circuits are still expensive, whereas circuits capable of encoding divided images are inexpensive and readily available. Nevertheless, this configuration is merely illustrative. There only needs to be at least one encoding section. The encoding process may be performed in a time-division parallel process.

1-2. Operation of Image Encoding Device 10

Figure 6:
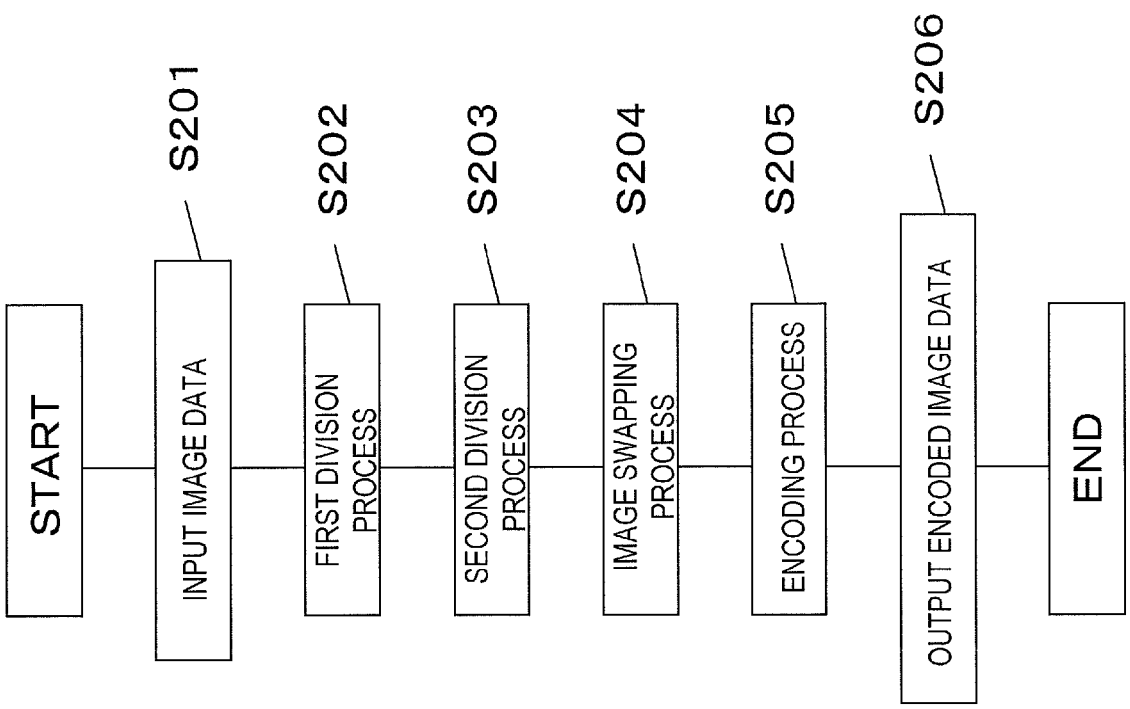
FIG. 6 is a flow chart showing the procedure of an operation of the image encoding device 10.

Referring now to FIG. 6, an operation of the image encoding device 10 of the present embodiment will be described.

FIG. 6 is a flow chart showing the procedure of an operation of the image encoding device 10.

One frame of image data is input to the image encoding device 10 (step 201). The first image division section 100 spatially divides the input image data into pieces of image data each having an appropriate image size (step 202). As a result, a plurality of partial images are obtained.

Each of the second image division sections 101a to 101d further spatially divides the corresponding one of the partial images generated by the first image division section 100 (step 203). As a result, a plurality of image fragments are obtained from each partial image.

The image swapping section 102 swaps image fragments of partial images between the partial images (step 204).

The encoding sections 103a to 103d receive partial images 0', 1', 2' and 3' with shuffled image fragments, respectively, output from the image swapping section 102, and encode them based on MPEG-4 AVC/H.264, for example (step 205). Note that the encoding scheme may be MPEG-2, or the like. The image encoding device 10 outputs the compressed image data which have been encoded by the encoding sections 103a to 103d (step 206).

As described above, instead of directly encoding partial images obtained by the first image division section 100, the partial images are further divided by the second image division sections 101a to 101d into image fragments which are swapped by the image swapping section 102 to produce shuffled partial images, and the shuffled partial images are encoded by the encoding sections 103a to 103d. Then, it is possible to improve the uneven distribution of graphic patterns between the spatially-divided partial images, and to level the compression difficulty between partial images with shuffled image fragments.

Embodiment 2

The second image division sections 101a to 101d of Embodiment 1 generate strip-shaped image fragments.

The second image division sections 101a to 101d of the present embodiment generate image fragments which are not strip-shaped. The discussion below will focus on the second image division sections 101a to 101d and the shape of the image fragments.

Note that the configuration of the image encoding device of the present embodiment is the same as that of the image encoding device 10 of Embodiment 1. Therefore, the image encoding device of the present embodiment will be described assuming that it is the "image encoding device 10" shown in FIG. 1.

Parts of the configuration and the operation of Embodiment 2 that are different from those of Embodiment 1 will be described below. Components and the operation thereof which are not mentioned below are the same as those of Embodiment 1.

Figure 7:
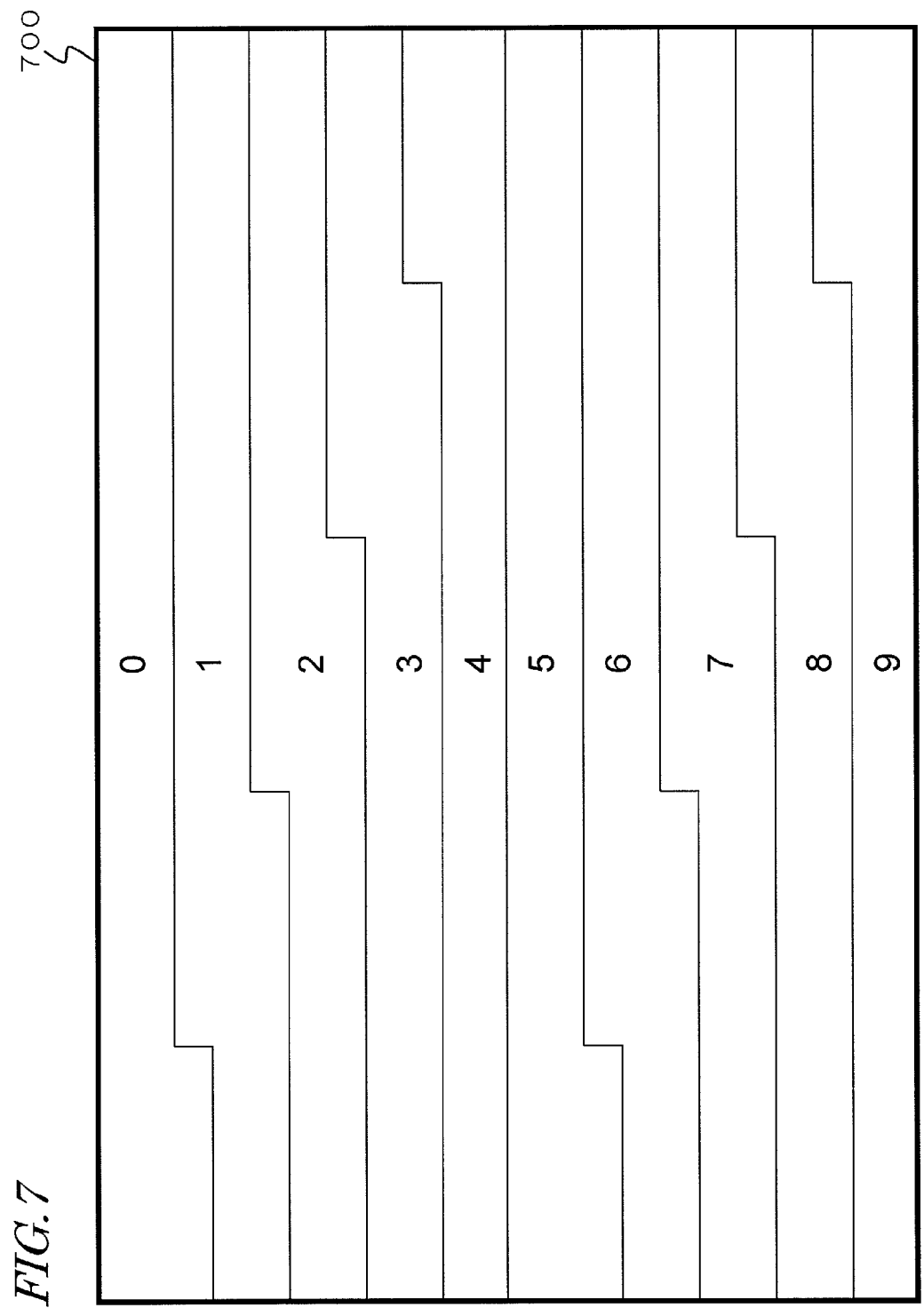
FIG. 7 is a diagram showing a partial image division scheme of the second image division sections 101a to 101d according to Embodiment 2.

FIG. 7 shows a division scheme for dividing partial images into pieces by the second image division sections 101a to 101d of the present embodiment. Each of the second image division sections 101a to 101d divides a corresponding one of the rectangular partial images shown in FIG. 2 into ten image fragments shaped as shown in FIG. 7. The number of image fragments, i.e. 10, comes from the number of slices in the encoding sections 103a to 103d, i.e. 10. Note that the number and shape of slices are preset in the encoding sections 103a to 103d. Either embodiment is an example where each partial image is divided into image fragments by the second image division sections 101a to 101d so as to conform with the specifications of the encoding sections 103a to 103d.

Where parallel encoding is performed by using a plurality of encoding sections 103a to 103d, each of the second image division sections 101a to 101d divides a corresponding one of the partial images into image fragments along the slice division boundaries of the encoding sections 103a to 103d. An advantage of such a division is that the compression efficiency does not lower even with an encoding scheme that utilizes the correlation between adjacent pixels (or adjacent macroblocks) such as MPEG-4 AVC/H.264. In MPEG-4 AVC/H.264, the process does not reference adjacent pixels between slices. Therefore, if the division into image fragments is done along the slice division boundaries, the compression efficiency will not be influenced. Note that in the present embodiment, the second image division sections 101a to 101d generate image fragments so that for any macroblock of a slice, a plurality of adjacent macroblocks are included therein. Therefore, encoding is done by utilizing adjacent macroblocks. The term "adjacent" as used herein refers not only to being adjacent in the horizontal direction but also to being adjacent in the vertical direction.

Figure 8:
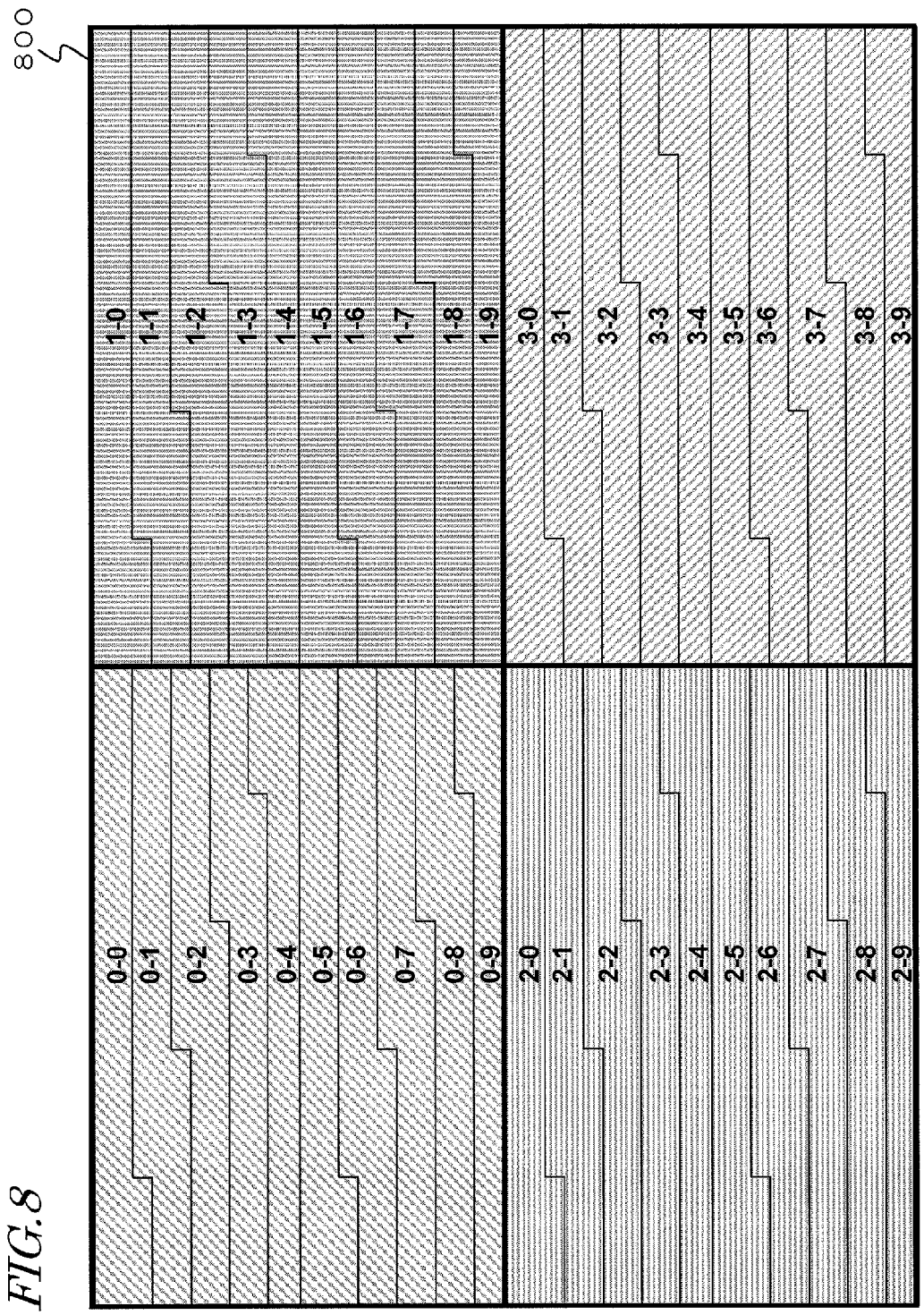
FIG. 8 is a diagram showing how an input image is divided into pieces according to Embodiment 2.

FIG. 8 shows a divided state where the first image division section 100 divides an input image into four rectangular partial images of an equal size, and each of the second image division sections 101a to 101d re-divides a corresponding one of the partial images into ten image fragments so as to conform with the slice division boundaries of the encoding sections 103a to 103d.

The image fragments obtained by the second image division sections 101a to 101d do not all have the same shape. Therefore, there are shape-related limitations on determining image fragments to be swapped between partial images by the image swapping section 102. The image swapping section 102 of the present embodiment swaps image fragments of the same shape between partial images to generate partial images with shuffled image fragments.

Figure 9:
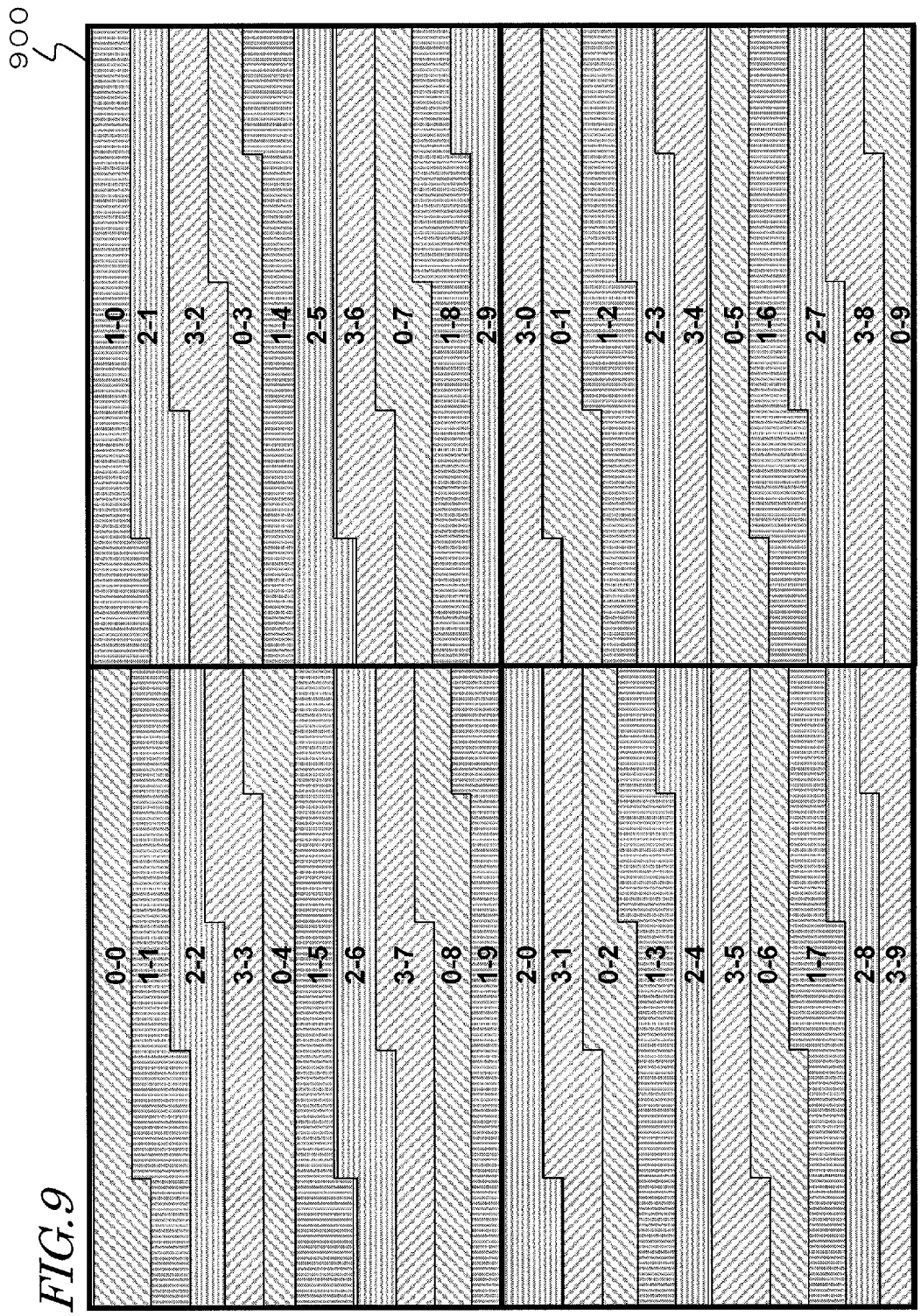
FIG. 9 is a diagram showing a group of partial images 900 where image fragments have been shuffled by the image swapping section 102 according to Embodiment 2.

FIG. 9 shows a group of partial images 900 where image fragments have been shuffled by the image swapping section 102 of the present embodiment.

In the present embodiment, the image shuffling rule is defined by the following expression.

Shuffled image fragment [x]–[y]=Image fragment [(x+y)%N]–[y]

where [x]–[y] is the number (0-0, 0-1, 0-2, 0-3, 1-0, etc.) designating an image fragment as used in FIGS. 8 and 9. N is the number of divided pieces of the first image division section 100. M is the number of divided pieces of the second image division sections 101a to 101d. Moreover, x is an integer from 0 to N−1, and y is an integer from 0 to M−1. In Embodiment 2, N=4 and M=10. The symbol "%" in the expression denotes a remainder operator.

In the present embodiment, the number of image fragments (ten) obtained by each of the second image division sections 101a to 101d is not a multiple of the number of partial images (four) obtained by the first image division section 100, and it is therefore not possible to shuffle the image fragments completely evenly. Nevertheless, a sufficient leveling effect is expected from swapping and shuffling image fragments between partial images.

Note that the above-described swapping rule of the image swapping section 102 is merely illustrative. Other shuffling rules may be employed. It is only necessary that at least one image fragment of a partial image is swapped with an image fragment having the same shape from another partial image. The advantages of the present invention can be obtained even in such a case, as compared with cases where no shuffling is done.

Note that while the present embodiment is directed to an example where the number of slices of the encoding sections 103a to 103d is ten, the number of slices does not need to be ten. Moreover, the number of partial images obtained by the first image division section 100 is not limited to four.

A variation regarding the number of partial images will now be described.

Figure 10:
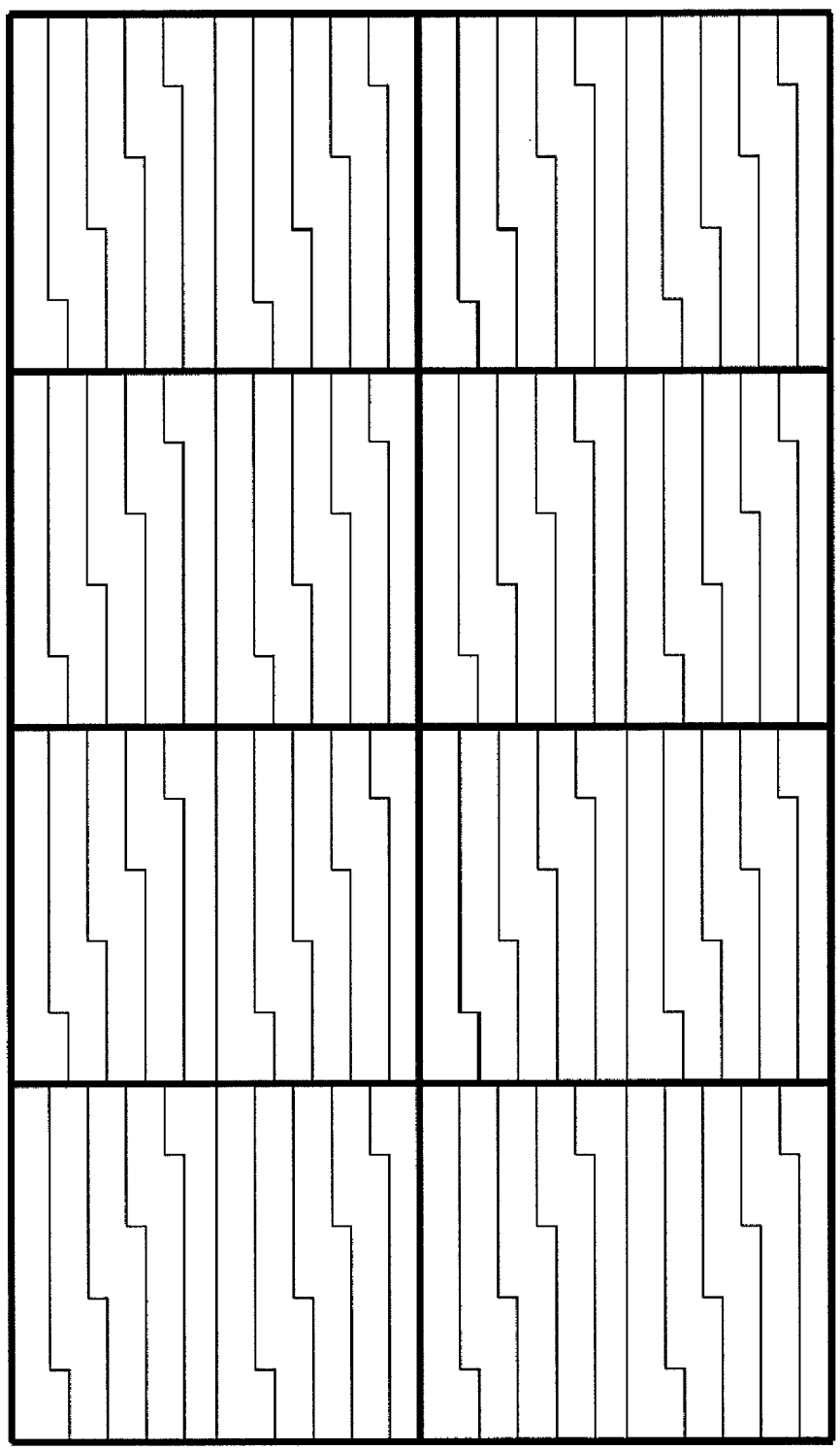
FIG. 10 is a diagram showing an example where the first image division section 100 divides an input image into eight partial images (two rows by four columns).

For example, FIG. 10 shows an example where the first image division section 100 divides an input image into eight partial images (two rows by four columns). FIG. 10 also shows ten image fragments into which each partial image is divided by a second image division section. In this variation, eight second image division sections are provided. Note however that there may be four second image division sections 101a to 101d, each of which processes two partial images in a time-division parallel process. Alternatively, there may be one second image division section which processes eight partial images in a time-division parallel process. Note that image fragments of each partial image in this variation are shaped as shown in FIG. 7.

After image fragments are generated as shown in FIG. 10, the image swapping section 102 swaps image fragments of the same shape with each other between partial images. As a result, the uneven distribution of graphic patterns is reduced more than in the example shown in FIG. 9. By encoding such partial images through encoding sections, it is possible to level the compression difficulty between partial images with shuffled image fragments.

Embodiment 3

The present embodiment is directed to an image encoding device in which an image expansion section is added to the configuration of the image encoding device 10 of Embodiment 1 or 2.

Figure 11:
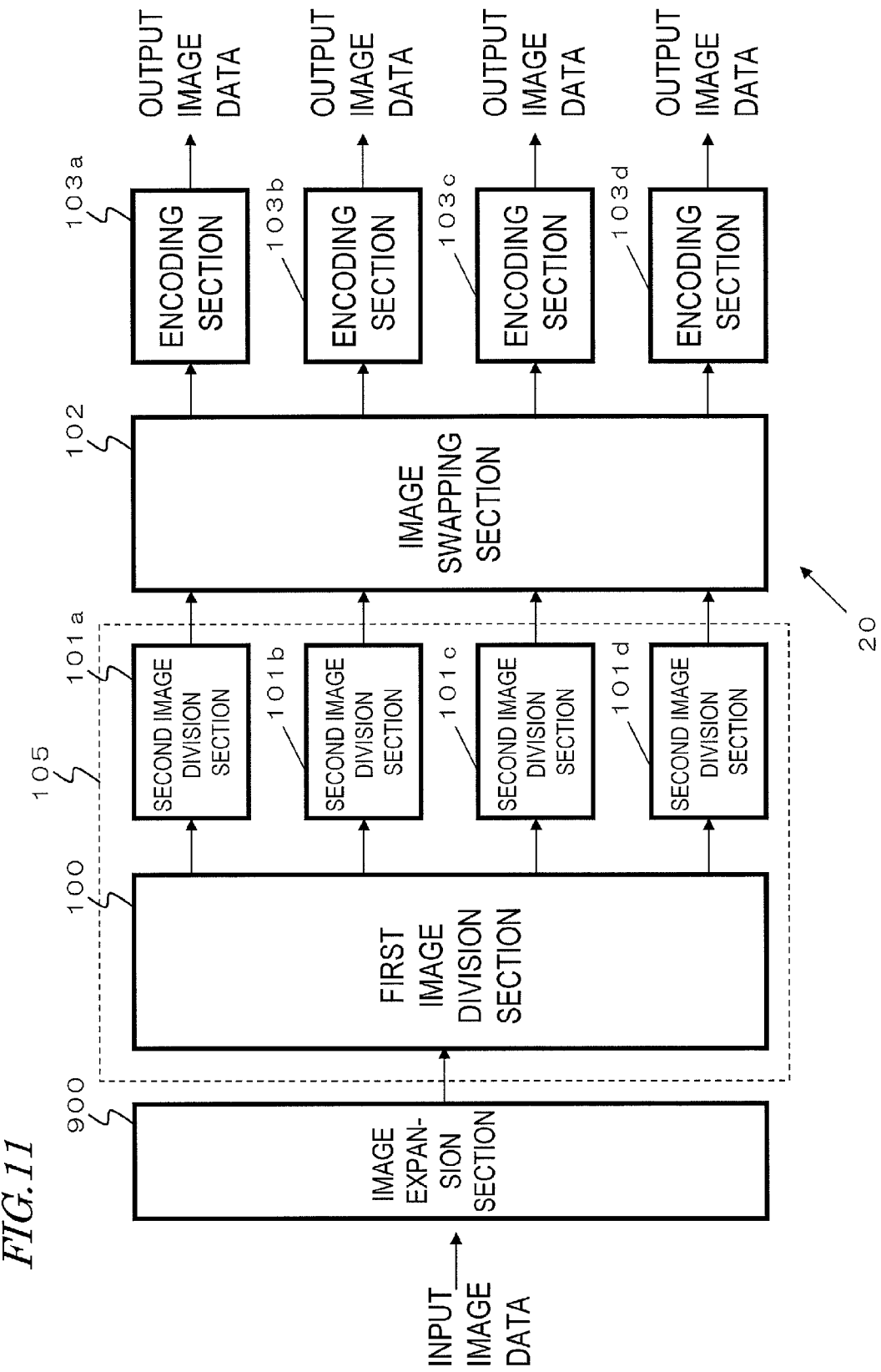
FIG. 11 is a diagram showing a configuration of an image encoding device 20 according to Embodiment 3.

FIG. 11 shows a configuration of an image encoding device 20 of the present embodiment. In FIG. 11, like components of the image encoding device 20 to those of the image encoding device 10 of Embodiment 1 in terms of function are denoted by like reference numerals and will not be described below.

An image expansion section 900 has a function of expanding the size of the image of the input image data. The image size is expanded for the purpose of adjusting the size of the image of the input image data so as to obtain partial images of a size that can be processed by the encoding sections 103a to 103d. Where the size of the input image is not an integral multiple of an image size that can be processed by the encoding sections 103a to 103d, it is not possible, as it is, to obtain partial images of a size that can be encoded by the encoding sections 103a to 103d. Therefore, in the present embodiment, the image expansion section 900 is provided preceding the first image division section 100 to thereby adjust the size of the image of the input image data.

Figure 12:
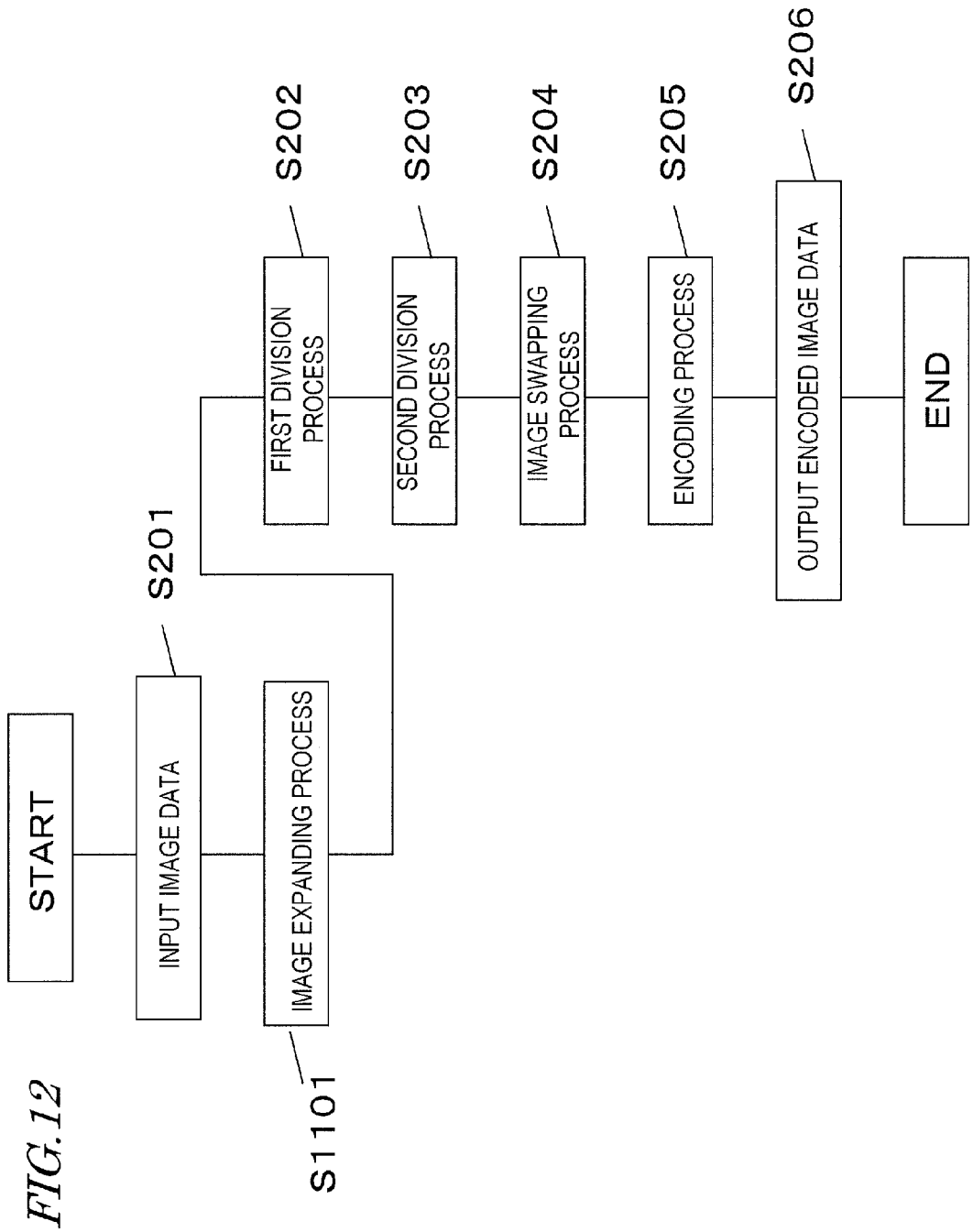
FIG. 12 is a flow chart showing the procedure of an operation of the image encoding device 20.
Figure 13:
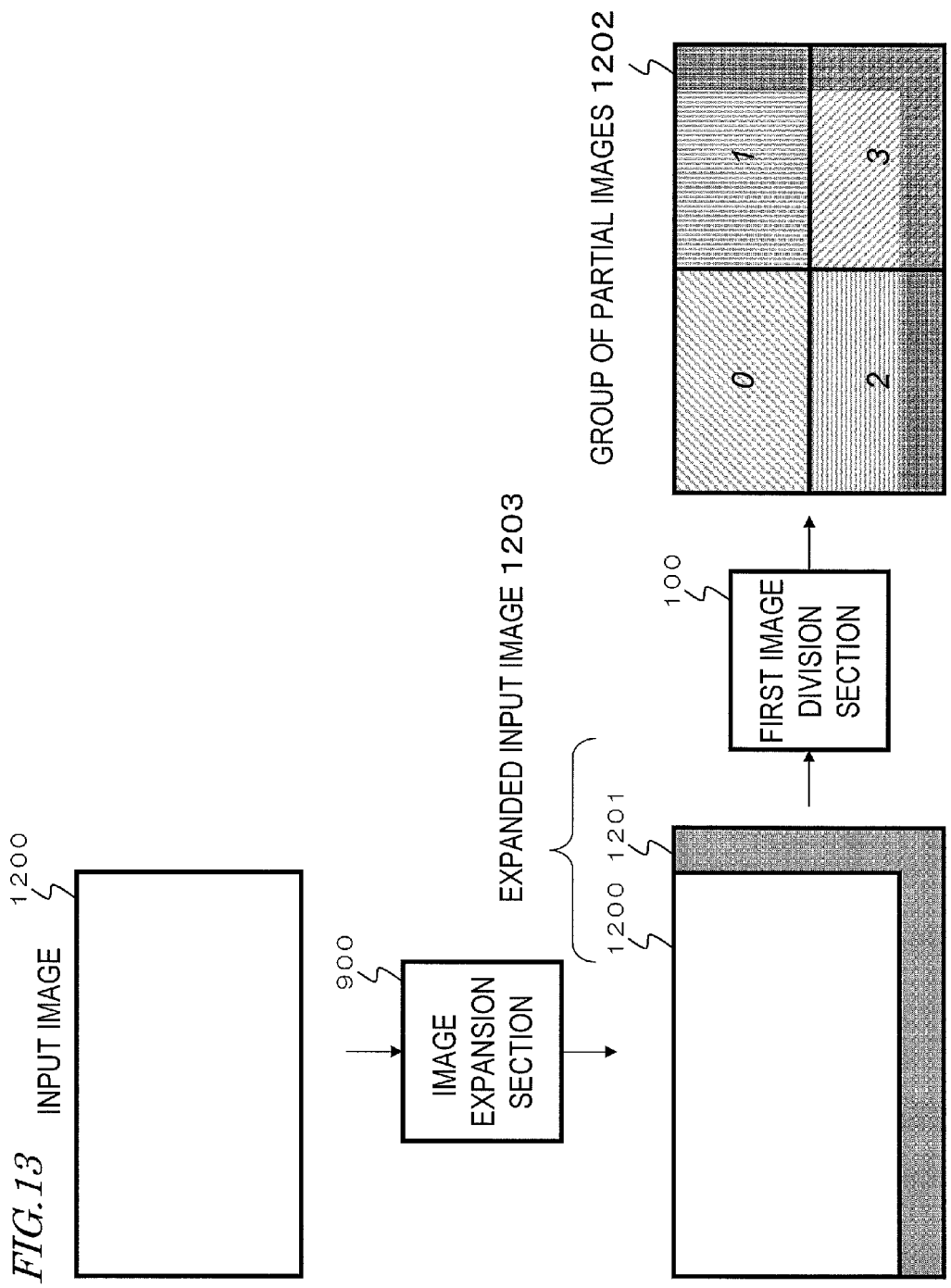
FIG. 13 is a schematic diagram showing a function of an image expansion section 900.

Referring now to FIGS. 12 and 13, an operation of the image encoding device 20 of the present embodiment will be described. FIG. 12 is a flow chart showing the procedure of an operation of the image encoding device 20. FIG. 13 is a schematic diagram showing a function of the image expansion section 900. In the present embodiment, a difference from the operation of the image encoding device of Embodiment 1 is that there is an image expansion process (step 1101). Other processes are the same as those of Embodiment 1, and will not be described below.

First, the image expansion section 900 determines whether the size of an input image 1200 is an integral multiple of an image size that can be processed by the encoding sections 103a to 103d. If so, the image expansion section 900 performs no further process, but passes the received input image data to the first image division section 100. If it is determined that it is not an integral multiple, the image expansion section 900 expands the image size by inserting invalid pixels until the size of the input image 1200 is an integral multiple of an image size that can be processed by the encoding sections 103a to 103d. The term "invalid pixels" refers to, for example, padding pixels whose pixel value is null (e.g., 0) for each color component. Note that the pixel value of an invalid pixel may be any value that cannot possibly be taken by a pixel that is part of an input image.

For example, it is assumed in FIG. 13 that the size of the input image 1200 is 7680 pixels (horizontal) by 4064 pixels (vertical). It is also assumed that an image size that can be processed by the encoding sections 103a to 103d is 2048 pixels (horizontal) by 1080 pixels (vertical).

Then, the image expansion section 900 determines that the size of the input image 1200 is not an integral multiple of an image size that can be processed by the encoding sections 103a to 103d. Then, the image expansion section 900 generates an input image 1203 that has been expanded by inserting invalid pixels 1201 as shown in FIG. 13. The invalid pixels 1201 are added to the input image 1200 in an L-shaped pattern, expanding the input image by 512 pixels in the horizontal direction and by 256 pixels in the vertical direction.

When the image expansion section 900 passes the expanded input image 1203 to the first image division section 100, the first image division section 100 divides the image including the invalid pixels 1201 into a plurality of partial images. A group of partial images 1202 to be output as a result can be encoded by using a plurality of (four in the above-described example) existing encoding sections 103a to 103d in parallel. Note that the pixel value of the inserted invalid pixels may be any value.

Note however that for the image decoding process to be described later, there needs to be information indicating whether the decoded image is an image with invalid pixels added thereto and, if invalid pixels are added, information indicating the number of such pixels. Therefore, the image expansion section 900 is capable of generating information indicating whether the image output from the image expansion section 900 includes invalid pixels and information indicating the number of pixels added. For example, where invalid pixels are commonly added to a sequence of images forming a video, the image expansion section 900 may add the above-mentioned information to management information which accompanies the encoded data. Alternatively, they may be embedded in UMID information as management information (metadata) in encoded data. UMID information is identification information uniquely added to each encoded data.

Note that invalid pixels do not need to be added in an L-shaped pattern. The method may be any method as long as invalid pixels can be added so that the invalid pixels are evenly included in partial images after division. For example, FIG. 14(a) shows an expanded input image 1300 with invalid pixels added around an input image. As compared with the example of FIG. 13, the strip of invalid pixels to be added in the horizontal direction and that to be added in the vertical direction are each divided into two strips which are separately added so as to surround the input image. In the example of FIG. 14(a), the first image division section 100 divides the expanded input image 1300 into four equal pieces to thereby generate a group of partial images 1301.

FIG. 14(b) shows an expanded input image 1302 with invalid pixels added in an L-shaped pattern and a cross-shaped pattern to an input image. As compared with the example of FIG. 13, the strip of invalid pixels to be added in the horizontal direction is divided into two strips which are added in the central portion of the input image in the vertical direction and in the bottom portion thereof, and the strip of invalid pixels to be added in the vertical direction is divided into two strips which are added in the central portion of the input image in the horizontal direction and in the right edge portion thereof. In the example of FIG. 14(b), the first image division section 100 divides the expanded input image 1302 into four equal pieces to thereby generate a group of partial images 1303.

By adding invalid pixels as described above, the area of inserted invalid pixels can be made equal between partial images, thus leveling the graphic pattern complexity therebetween, in the group of partial images 1301 or the group of partial images 1303.

Embodiment 4

4-1. Configuration of Image Decoding Device

Embodiments 1 to 3 are directed to an image encoding device for encoding image data.

The present embodiment and Embodiment 5 are directed to image decoding devices for decoding encoded image data. More specifically, the present embodiment is primarily directed to a device for decoding an image that has been encoded by an image encoding device of Embodiment 1.

FIG. 15 is a block diagram showing a configuration of an image decoding device 30 of the present embodiment. The image decoding device 30 includes decoding sections 1401a to 1401d, decoded image division sections 1402a to 1402d, a decoded image swapping section 1403, and a decoded image integration section 1404.

Each of the decoding sections 1401a to 1401d receives and decodes an encoded partial image. In the present embodiment, the decoding sections 1401a to 1401d decode data of encoded partial images in parallel. The rule by which the decoding sections 1401a to 1401d receive the encoded data may be as follows. For example, where the encoded image data are recorded on a recording medium in the order they were output from the encoding sections 103a, 103b, 103c and 103d of Embodiment 1, the encoded image data may be read out and passed to the decoding sections 1401a, 1401b, 1401c and 1401d in that order.

Note that the present embodiment is an embodiment where the number of the decoding sections 1401a to 1401d is equal to the number of partial images so that the partial images can be decoded in parallel. It is considered that such a configuration is advantageous at present in terms of cost. This is for the same reason as the reason why the number of the encoding sections 103a to 103d is equal to the number of partial images in Embodiment 1. Nevertheless, this configuration is merely illustrative. There only needs to be at least one decoding section, and the decoding process may be performed in a time-division parallel process.

Each of the decoded image division sections 1402a to 1402d spatially divides an image of the image data output from a corresponding one of the decoding sections 1401a to 1401d to generate a plurality of image fragments by the same division scheme as that employed for the second image division sections 101a to 101d.

For example, where the present invention is embodied as a single piece of recording/reproduction apparatus, the recording/reproduction apparatus operates as an image encoding device according to one of the embodiments above during an encoding process, and as an image decoding device according to the present embodiment or Embodiment 5 to be described below during a decoding process. Such recording/reproduction apparatus can readily know, when performing a decoding process, the division scheme employed in the encoding process based on information stored inside that indicates the division scheme or based on a predetermined division scheme. Note that the information indicating the division scheme may be attached to encoded image data by the image encoding device, so that the image decoding device can identify the division scheme by referencing that information. The latter method is effective even in a case where the image encoding device and the image decoding device are separate from each other.

It is assumed in the present embodiment that the division scheme used in the encoding process is predetermined, and the decoded image division sections 1402a to 1402d each perform a division process based on the predetermined division scheme.

FIG. 16 schematically shows the process of the decoded image division sections 1402a to 1402d.

The decoded image division sections 1402a to 1402d receive a group of decoded partial images 1600 output from the decoding sections 1401a to 1401d, respectively. Each of the decoded image division sections 1402a to 1402d divides the corresponding partial image into image fragments 1601 by a predetermined division scheme. As a result of the division, each of the group of partial images 1600 is divided into four strip-shaped image fragments 1601. This division scheme is the same as that of Embodiment 1, and the shape and the size of the image fragments are the same as those of Embodiment 1.

Note that the group of image fragments 1601 generated by the decoded image division sections 1402a to 1402 are in the same arrangement as the group of shuffled image fragments 501 generated by the image swapping section 102 as shown in FIG. 4, for example.

Note that in the present embodiment, the decoded image division sections 1402a to 1402d generate image fragments by the same division scheme as that of Embodiment 1. Note however that the shape and the number of divided pieces may be determined to conform with those of the division scheme used by the second image division sections 101a to 101d in the encoding process. Therefore, the shape of the image fragments is not limited to a strip shape. For example, the division scheme employed in Embodiment 2 shown in FIG. 7 may be employed. Where the second image division sections 101a to 101d generate image fragments from partial images by a slice division scheme rather than a simple horizontal division scheme, the decoded image division sections 1402a to 1402d divide partial images into image fragments also by the same division scheme.

The decoded image division sections 1402a to 1402d divide, in parallel, partial images output from the decoding sections 1401a to 1401d to thereby output image fragments. Note that although the present embodiment is an embodiment where the number of the decoded image division sections 1402a to 1402d is equal to the number of partial images so that the partial images can be divided in parallel, the number of the decoded image division sections 1402a to 1402d may be any number that is at least one, and the division process may be performed in a time-division parallel process. For example, FIG. 15 shows an image division section 1402 obtained by combining the decoded image division sections 1402a to 1402d into a single unit.

Reference is made again to FIG. 15.

The decoded image swapping section 1403 swaps image fragments of partial images between the partial images by the same image swapping scheme as that used by the image swapping section 102 in the encoding process. In the present embodiment, the decoded image swapping section 1403 performs the swapping process based on the image swapping scheme used in the encoding process, which is pre-stored in the decoded image swapping section 1403.

FIG. 17 schematically shows the process of the decoded image swapping section 1403.

The decoded image swapping section 1403 swaps image fragments of partial images between the partial images based on the same image swapping scheme used by the image swapping section 102 in the encoding process. For example, the image shuffling rule, shuffled image fragment [x]–[y]=image fragment [(x+y)% N]–[y], has been described above in Embodiment 1. The decoded image swapping section 1403 swaps image fragments by performing an operation from the right-hand side to the left-hand side of this expression.

In the present embodiment, partial images are made up of a group of image fragments 1700 shuffled by the image swapping section 102. The group of image fragments 1601 form partial images 0', 1', 2' and 3' generated by the image swapping section 102. The decoded image swapping section 1403 performs a reversed swapping process, which is opposite to the swapping process performed by the image swapping section 102, to thereby generate a group of swapped image fragments 1701. The group of image fragments 1701 are output as partial images 0, 1, 2 and 3. Note that partial images 0, 1, 2 and 3 are the same as partial images 0, 1, 2 and 3 generated by the second image division sections 101a to 101d in Embodiment 1.

The decoded image integration section 1404 integrates together the partial images output from the decoded image swapping section 1403, and outputs an integrated piece of decoded image data.

FIG. 18 shows an integration method for integrating together a group of partial images 1800 by the decoded image integration section 1404. The decoded image integration section 1404 receives partial images 0, 1, 2 and 3 output from the decoded image swapping section 1403, and arranges the partial images in a predetermined arrangement. For example, the decoded image integration section 1404 places partial image 1 to the right of partial image 0, partial image 2 under partial image 0, and partial image 3 to the right of partial image 2.

The decoded image integration section 1404 reconstructs and outputs a single image 1801 from the group of partial images 1800. Thus, the partial images are integrated together as the output image 1801 with a positional relationship corresponding to the predetermined arrangement.

The above-described process is a reversed process from the process of Embodiment 1 in which the first image division section 100 generates and outputs a group of partial images as partial images 0, 1, 2 and 3.

Note that although the present embodiment is directed to an example where the decoded image integration section 1404 integrates together four rectangular areas of an equal size into a single image, the shape and the number of divided pieces may be the same as those of the division scheme in the encoding process, and are not limited to those of the example shown in FIG. 18.

4-2. Operation of Image Decoding Device

Referring now to FIG. 19, an operation of the image decoding device 30 of the present embodiment will be described.

FIG. 19 is a flow chart showing the procedure of an operation of the image decoding device 30.

It is assumed in the present embodiment that encoded image data to be input to the image decoding device 30 is the encoded image data generated by the image encoding device in Embodiment 1.

The encoded image data is input to the image decoding device 30 (step 1501).

The decoding sections 1401a to 1401d decode the input encoded image data based on the encoding scheme used in the encoding process (step 1502). For example, the decoding sections 1401a to 1401d decode the image based on MPEG-4 AVC/H.264. Note that the scheme used in the decoding process is not limited to MPEG-4 AVC/H.264, but may be the same scheme as that used in the encoding process.

Each of the decoded image division sections 1402a to 1402d spatially divides a partial image output from a corresponding one of the decoding sections 1401a to 1401d by a division scheme conforming with the division scheme used by the second image division sections 101a to 101d (step 1503).

The decoded image swapping section 1403 swaps image fragments of partial images between the partial images (step 1504).

The decoded image integration section 1404 combines together the partial images output from the decoded image swapping section 1403 into a single piece of decoded image data (step 1505). The image decoding device 30 outputs the decoded image data which has been integrated by the decoded image integration section 1404 (step 1506).

As described above, the decoding sections 1401a to 1401d decode the encoded data, of which the compression difficulty has been leveled between spatially-divided partial images obtained in the encoding process by improving the uneven distribution of graphic patterns between the partial images. Thus, it is possible to level the decoding process. Moreover, by performing an image swapping process corresponding to that performed in the encoding process, it is possible to properly restore un-encoded image data.

Note that even where an image is encoded after it is divided by the division scheme shown in FIG. 10 into image fragments which are then swapped with one another, the image decoding device 30 can reconstruct and output the un-encoded input image by performing the process as described above.

Embodiment 5

Embodiment 5 is directed to an image decoding device obtained by adding an encoding information obtaining section to the configuration of the image decoding device 30 of Embodiment 4.

FIG. 20 shows a configuration of an image decoding device 40 of the present embodiment. In FIG. 20, like components of the image decoding device 40 to those of the image decoding device 30 of Embodiment 4 in terms of function are denoted by like reference numerals and will not be described below.

Referring to FIG. 20, an encoding information obtaining section 1900 obtains, from the input encoded image data, information regarding the division scheme and the swapping scheme used in the encoding process. For example, assume that each of the image encoding devices of Embodiments 1 to 3 stores, embedded in encoded data, the division scheme and the swapping scheme used by the first image division section 100, the second image division sections 101a to 101d and the image swapping section 102 in the encoding process. For example, it is assumed in Embodiment 5 that the division scheme and the swapping scheme are embedded in UMID information as metadata in encoded data.

The encoding information obtaining section 1900 obtains, from UMID which is metadata, the information regarding the division scheme and the swapping scheme in the encoded data. Then, the encoding information obtaining section 1900 outputs division scheme information to the decoded image division section 1202, swapping scheme information to the decoded image swapping section 1203, and division scheme information to the decoded image integration section 1404.

Note that although it is assumed in Embodiment 5 that the division scheme and the swapping scheme are embedded in UMID information as metadata in encoded data, the place where the information regarding the division scheme and the swapping scheme is embedded is not limited to UMID in the encoded data. The information may be stored in management information which accompanies the encoded data.

Part of the operation of the image decoding device 40 of the present embodiment that differs from that of the image decoding device 30 of Embodiment 4 will now be described.

In Embodiment 4, the decoded image division sections 1402a to 1402d pre-store the division scheme used in the encoding process. In the present embodiment, the decoded image division sections 1402a to 1402d perform the division process based on the division scheme information used in the encoding process which is input from the encoding information obtaining section 1900.

In Embodiment 4, the decoded image swapping section 1403 pre-stores the swapping scheme used in the encoding process. In the present embodiment, the decoded image swapping section 1403 performs the swapping process based on the swapping scheme information used in the encoding process which is input from the encoding information obtaining section 1900.

In Embodiment 4, the decoded image integration section 1404 pre-stores the division scheme used in the encoding process. In the present embodiment, the decoded image integration section 1404 performs the integration process based on the division scheme information used in the encoding process which is input from the encoding information obtaining section 1900.

As described above, information regarding the division scheme and the swapping scheme used in the encoding process is exchanged, as part of the encoded data, between the image encoding device and the image decoding device, thereby enabling high flexibility toward changes to the division scheme and the swapping scheme, thus realizing a decoding and integration process that can automatically and properly restore an un-encoded, un-divided image.

The process of a device according to any of the above-described embodiments and variations thereof may be implemented by one or more processors which are computers executing a computer program composed of various instruction codes on a memory. Such a computer program defines a process procedure based on a flow chart shown in FIG. 6, 12 or 19, for example. Such a computer program may be circulated in the market as a product stored in a recording medium such as an optical disc (e.g., a CD-ROM) and a semiconductor memory (e.g., a memory card), or may be transmitted through a telecommunications network such as the Internet. Note that a processor may be implemented as hardware such as a DSP, a chip circuit, an optical disc controller, or the like, which is a semiconductor circuit with a built-in computer program.

The image encoding device and the image decoding device of the present invention enable compression/encoding of a high-resolution motion picture using a plurality of lower-resolution codecs in parallel, and are applicable to various image recording devices such as camcorders.

What is claimed is:

1. An image encoding device comprising:
    an image division section for dividing one frame of image into a plurality of image fragments, grouping the plurality of image fragments into N sets (N: an integer of 2 or more), and outputting the N sets of image fragments as N partial images;

an image swapping section for swapping at least one image fragment with another between the N partial images to output N partial images each having shuffled image fragments; and an encoding section for encoding the N partial images output from the image swapping section.

2. The image encoding device according to claim 1, wherein the N partial images correspond respectively to a plurality of areas into which the one frame of image is divided.

3. The image encoding device according to claim 2, wherein the second image division section divides each of the N partial images into a number of image fragments which is an integral multiple of N.

4. The image encoding device according to claim 1, the image division section comprising:

a first image division section for dividing the one frame of image into the N partial images; and a second image division section for further dividing each of the N partial images from the first image division section into image fragments, and outputting the image fragments.

5. The image encoding device according to claim 4, wherein the second image division section divides each of the N partial images into a number of image fragments which is an integral multiple of N.

6. The image encoding device according to claim 1, wherein the image division section generates image fragments having the same shapes as those of slices preset in the encoding section.

7. The image encoding device according to claim 6, wherein the image division section generates partial images each formed by image fragments of the same shape.

8. The image encoding device according to claim 6, wherein the image division section generates partial images each formed by image fragments of different shapes.

9. The image encoding device according to claim 6, wherein:

each of the slices is formed by a plurality of macroblocks; and the image division section generates the image fragments so that for any macroblock, a plurality of adjacent macroblocks are included.

10. The image encoding device according to claim 1, wherein the image division section determines a size of each of the N partial images so that the encoding section can process each partial image.

11. The image encoding device according to claim 1, further comprising an image expansion section for adjusting a size of the one frame of image so that the size is an integral multiple of a size which can be processed by the encoding section in a case where the size of the one frame of image is not an integral multiple of a size which can be processed by the encoding section.

12. The image encoding device according to claim 11, wherein:

the image expansion section adds a plurality of pixels to the one frame of image to thereby adjust the size of the one frame of image so that the size is an integral multiple of a size which can be processed by the encoding section; and each of the added pixels has a pixel value which cannot possibly be taken by a pixel which is part of the one frame of image.

13. The image encoding device according to claim 12, wherein the image expansion section adjusts the size of the one frame of image so that the size is an integral multiple of a size which can be processed by the encoding section so that the added pixels are evenly included in the N partial images.

14. An image decoding device comprising:

a decoding section for decoding each of N encoded partial images;

an image division section for dividing each of the N decoded partial images into a plurality of image fragments having a predetermined shape;

a decoded image swapping section for swapping at least one image fragment with another between the N partial images based on a predetermined rule to thereby output N partial images each having shuffled image fragments; and a decoded image integration section for integrating together the N partial images output from the decoded image swapping section into a single image, and outputting the decoded image.

15. The image decoding device according to claim 14, wherein:

data of the N encoded partial images includes, as management information, at least one of information regarding the number of partial images into which one frame of image is divided, information regarding a shape of image fragments into which each partial image is divided, information regarding the number of image fragments, and a rule regarding a swapping scheme for swapping image fragments with one another in an encoding process;

the image decoding device further comprises an encoding information obtaining section for obtaining the management information which is transmitted together with the data of the N encoded partial images; and at least one of the image division section, the decoded image swapping section and the decoded image integration section operates based on the management information obtained by the encoding information obtaining section.

* * * * *